US011520360B2

(12) United States Patent
Son et al.

(10) Patent No.: US 11,520,360 B2
(45) Date of Patent: Dec. 6, 2022

(54) COOLING SYSTEM AND METHOD FOR DECOATERS

(71) Applicant: Novelis Inc., Atlanta, GA (US)

(72) Inventors: JungYoung Son, Ulsan (KR); Edwin L. Rauch, Fulton, NY (US)

(73) Assignee: Novelis Inc., Atlanta, GA (US)

( * ) Notice: Subject to any disclaimer, the term of this patent is extended or adjusted under 35 U.S.C. 154(b) by 272 days.

(21) Appl. No.: 16/568,644

(22) Filed: Sep. 12, 2019

(65) Prior Publication Data
US 2020/0081463 A1 Mar. 12, 2020

Related U.S. Application Data

(60) Provisional application No. 62/730,049, filed on Sep. 12, 2018.

(51) Int. Cl.
*B05B 12/00* (2018.01)
*G05D 23/19* (2006.01)
(Continued)

(52) U.S. Cl.
CPC ......... *G05D 23/1917* (2013.01); *B05B 12/10* (2013.01); *G05B 13/021* (2013.01); *B08B 7/0071* (2013.01)

(58) Field of Classification Search
CPC ........ B08B 7/0071; B05B 12/10; F27D 15/02
See application file for complete search history.

(56) References Cited

U.S. PATENT DOCUMENTS

| 6,227,847 B1 | 5/2001 | Gillespie |
| 7,066,401 B2 | 6/2006 | Huffman et al. |
| 2018/0339316 A1* | 11/2018 | Son .................... F27D 19/00 |

FOREIGN PATENT DOCUMENTS

| AU | 7123301 | 9/2001 |
| CA | 1333973 C | 1/1995 |

(Continued)

OTHER PUBLICATIONS

International Patent Application No. PCT/US2019/050741, "International Search Report and Written Opinion", dated Nov. 12, 2019, 15 pages.

(Continued)

*Primary Examiner* — Binh X Tran
(74) *Attorney, Agent, or Firm* — Kilpatrick Townsend & Stockton LLP

(57) ABSTRACT

A cooling system for the decoating system includes a sensor, a control device, and a controller communicatively coupled with the sensor and the control device. The sensor is configured to measure a characteristic of the cooling system in the decoating system, the control device controls the characteristic of the cooling system, and the controller is configured to adjust the control device to adjust the characteristic of the cooling system based on at least one of a measured temperature within the decoating system or the measured characteristic. A method of controlling a temperature of the decoating system includes measuring a temperature within a piece of equipment of the decoating system and measuring a characteristic the cooling system in the piece of equipment of the decoating system. The method includes controlling the cooling system to adjust the characteristic based on at least one of the measured temperature or the measured characteristic.

10 Claims, 16 Drawing Sheets

(51) Int. Cl.
*G05B 13/02* (2006.01)
*B05B 12/10* (2006.01)
*B08B 7/00* (2006.01)

(56) References Cited

FOREIGN PATENT DOCUMENTS

| | | |
|---|---|---|
| CN | 101715532 | 5/2010 |
| CN | 102851416 A | 1/2013 |
| GB | 937289 | 9/1963 |
| GB | 2104634 A | 3/1983 |
| KR | 20010027165 | 4/2001 |

OTHER PUBLICATIONS

"FloMax® Air Atomizing Nozzles: high Efficiency Nozzles Offer Tight Control of Drop Size and Spray Coverage, Provide Precise Performance", Bulletin No. 187C, Spraying Systems Co. 2005 (8 pages).
Canadian Application No. 3,106,328 , Office Action, dated Apr. 11, 2022, 3 pages.
Chinese Application No. 201980059503.7 , Office Action, dated May 16, 2022, 24 pages.
European Application No. 19787112.2 , Notice of Decision to Grant, dated Jun. 23, 2022, 2 pages.
Korean Application No. 10-2021-7002732 , Office Action, dated Jan. 17, 2022, 18 pages.
Korean Application No. 10-2021-7002732 , Notice of Decision to Grant, dated Jun. 29, 2022, 3 pages.

\* cited by examiner

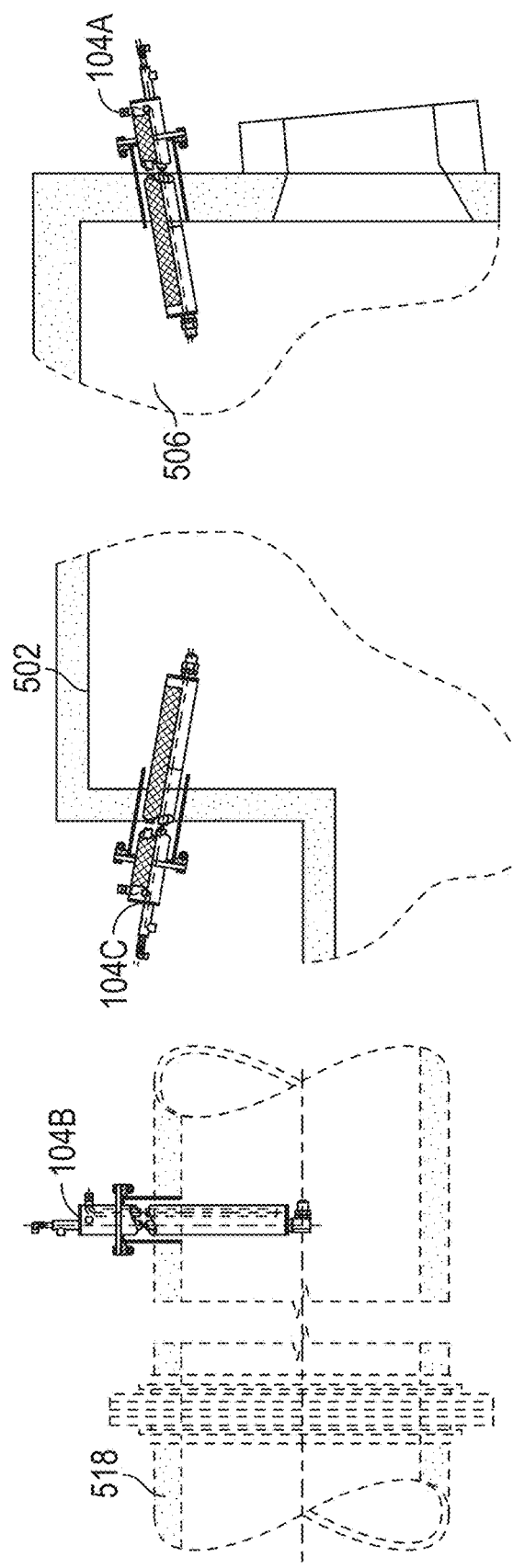
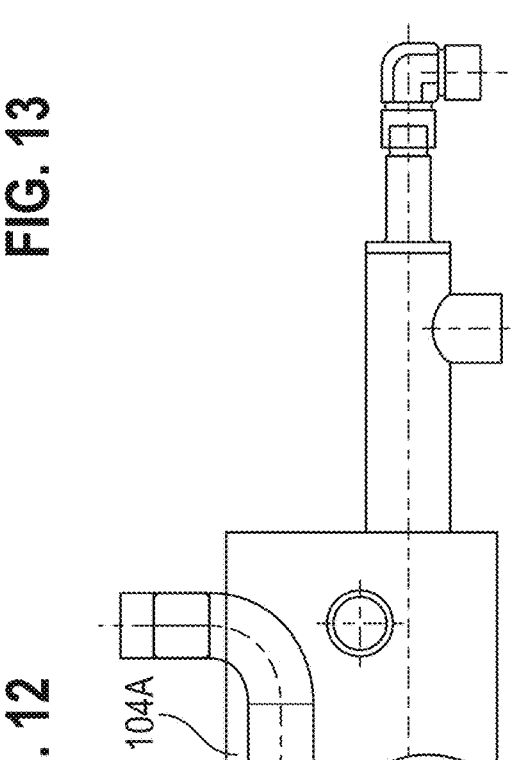
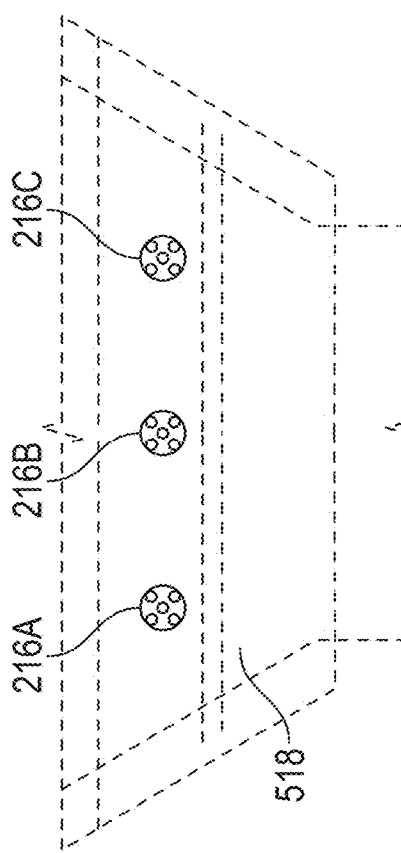
FIG. 11  FIG. 12  FIG. 13  FIG. 14  FIG. 15

COOLING SYSTEM AND METHOD FOR DECOATERS

REFERENCE TO RELATED APPLICATION

This application claims the benefit of U.S. Provisional Application No. 62/730,049, filed on Sep. 12, 2018 and entitled COOLING SYSTEM AND METHOD FOR DECOATERS, the content of which is hereby incorporated by reference in its entirety.

FIELD OF THE INVENTION

This application relates to decoating systems for metal recycling, and more particularly to cooling systems and methods for decoating systems.

BACKGROUND

During metal recycling, metal scrap (such as aluminum or aluminum alloys) are crushed, shredded, chopped, or otherwise reduced into smaller pieces of metal scrap. Oftentimes, the metal scrap has various coatings, such as oils, paints, lacquers, plastics, inks, and glues, as well as various other organic contaminants such as paper, plastic bags, polyethylene terephthalate, sugar residues, etc., that must be removed through a decoating process before the metal scrap can be further processed and recovered. During the decoating process, the metal scrap is fed into a decoater or kiln, and then is heated up to remove the coatings from the metal scrap. Sometimes, the organic compounds from the coatings raise temperatures inside the decoater, which may result in thermitting (burning of metal inside the decoater) or other serious damage to the equipment of the decoating system.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments of the present disclosure, a method of cooling a decoating system with a cooling system includes measuring a temperature within a piece of equipment of the decoating system. The method also includes measuring a coolant characteristic of a coolant dispensed by a sprayer of the cooling system into the piece of equipment of the decoating system and receiving the measured coolant characteristic. The method further includes adjusting a coolant control device to adjust the coolant characteristic based on the measured temperature and the measured coolant characteristic such that the cooling system provides cooling with the coolant to a desired temperature.

According to various embodiments of the present disclosure, a cooling system for a decoating system includes a sensor configured to measure a coolant characteristic of a coolant dispensed by a sprayer into the decoating system. The cooling system also includes a coolant control device controlling the coolant characteristic of the coolant. The cooling system further includes a controller communicatively coupled with the sensor and the coolant control device. In some aspects, the controller is configured to adjust the coolant control device to adjust the coolant characteristic of the coolant based on a measured temperature within the decoating system and the measured coolant characteristic such that the cooling system provides cooling with the coolant to a desired temperature.

According to some embodiments of the present disclosure, a method of controlling a temperature of a decoating system with a cooling system includes measuring a temperature within a piece of equipment of the decoating system, measuring a characteristic the cooling system in the piece of equipment of the decoating system, and receiving the measured characteristic. The method includes controlling the cooling system to adjust the characteristic based on at least one of the measured temperature or the measured characteristic such that the cooling system provides at least one of a desired temperature or a desired characteristic.

According to certain embodiments of the present disclosure, a cooling system for a decoating system includes a sensor, a control device, and a controller. The sensor is configured to measure a characteristic the cooling system in the decoating system. The control device controls the characteristic of the cooling system, and the controller is communicatively coupled with the sensor and the control device. The controller is configured to adjust the control device to adjust the characteristic of the cooling system based on at least one of a measured temperature within the decoating system or the measured characteristic such that the cooling system provides at least one of a desired temperature or a desired characteristic.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 11 is a sectional view of a portion of the decoating system of FIG. 10 taken along line A-A in FIG. 10.

FIG. 12 is a sectional view of a portion of the decoating system of FIG. 10 taken along line B-B in FIG. 10.

FIG. 13 is a detail view of a portion of the decoating system of FIG. 10 taken from detail circle C in FIG. 10.

FIG. 14 is a sectional view of a portion of the decoating system of FIG. 10 taken along line D-D in FIG. 10.

FIG. 15 is an enlarged view of a portion of the sprayer in the decoating system of FIG. 10.

DETAILED DESCRIPTION

The subject matter of examples of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
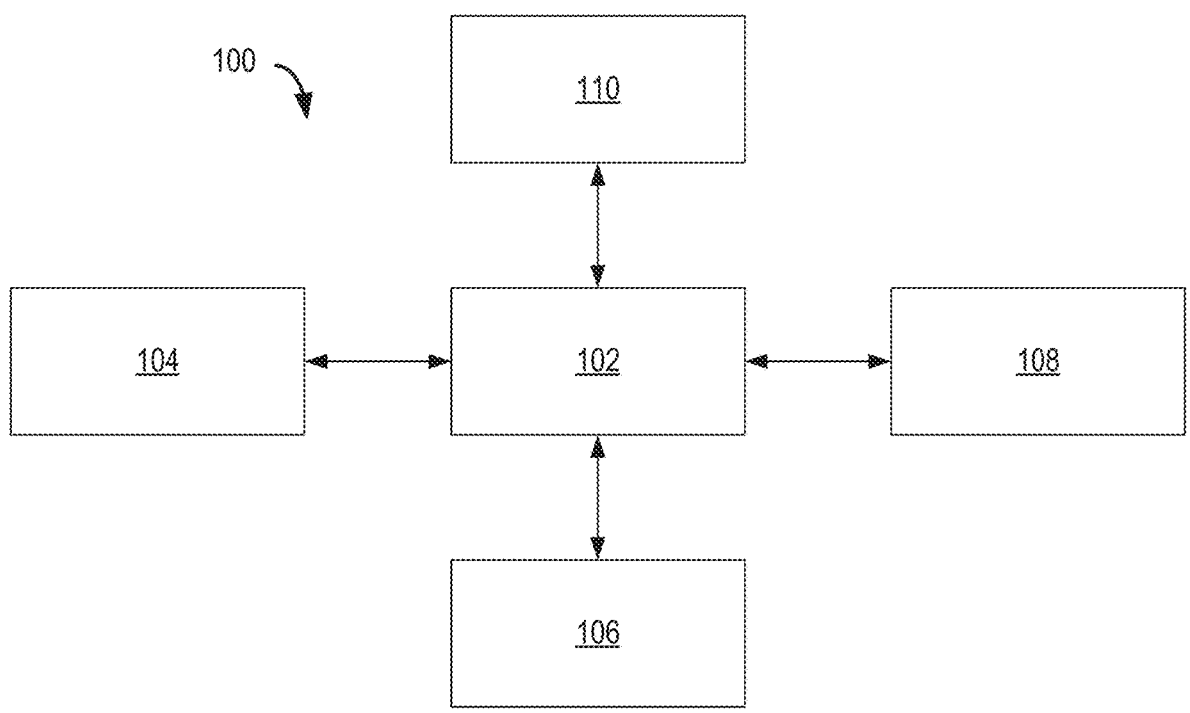
FIG. 1 is a schematic diagram of a cooling system for a decoating system according to aspects of the present disclosure.
Figure 22:
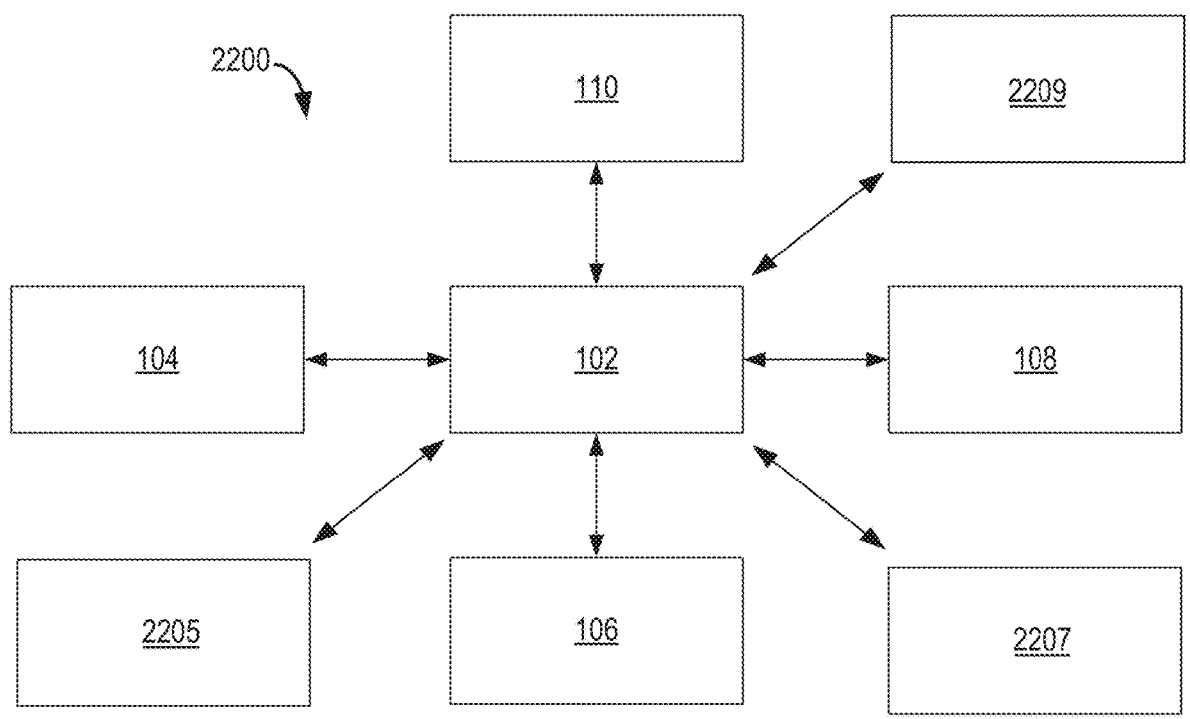
FIG. 22 is a schematic diagram of a cooling system for a decoating system according to aspects of the present disclosure.

FIG. 1 is a schematic of an example of a cooling system 100 for a decoating system according to aspects of the present disclosure. In various examples, the cooling system 100 generally includes a controller 102, a sprayer 104, a coolant control device 106 that controls a coolant characteristic of a coolant that is dispensed by the sprayer 104 into the decoating system, and a sensor 108 that measures the coolant characteristic of the coolant. The cooling system 100 may also include a temperature sensor 110 that measures a temperature within the decoating system, such as within a kiln, an afterburner, a duct between the kiln and afterburner, and/or various other pieces of equipment of the decoating system as discussed below. It will be appreciated that the number of coolant control devices 106, sprayers 104, and/or sensors 108 should not be considered limiting on the current disclosure. In some aspects, and as discussed in detail below, one sensor 108 and/or one coolant control device 106 are associated with a particular sprayer 104; however, in other examples, one sensor 108 and/or one coolant control device 106 may be associated with a plurality of sprayers 104. FIG. 22 illustrates another example of a cooling system 2200 for a decoating system. The cooling system 2200 is substantially similar to the cooling system 100 except that the cooling system 2200 also includes an oxygen control system 2205 and an organics control system 2207. The oxygen control system 2205 controls an oxygen level within the decoating system, such as within the kiln, and the organics control system 2207 controls the concentration of organic compounds within the decoating system. Various suitable sensors 2209 for the oxygen control system 2205 and/or the organics control system 2207 may also be included. The sensors 2209 may detect one or more characteristics about the gas flowing through the decoating system and may include, but are not limited to, oxygen sensors, organic compound sensors, atmospheric sensors, combinations thereof, or other suitable sensors as desired. In other examples, a cooling system for a decoating system includes at least one of the sprayer 104 and coolant control device 106, the oxygen control system 2205, or the organics control system 2207. Thus, while the following description may only refer to the cooling system 100, it will be appreciated that the description is equally applicable to the cooling system 2200.

The controller 102 may be any suitable processing device or combination of devices, and is communicatively coupled with the coolant control device 106 and the sensor 108. The controller 102 is also communicatively coupled with the temperature sensor 110, and optionally may be communicatively coupled with the sprayer 104. As discussed in detail below, the controller 102 is configured to control the coolant control device 106 during a decoating process to control the coolant characteristic of the coolant. The controller 102 may control the coolant control device 106 based on a measured temperature by the temperature sensor 110 within the decoating system and a measured coolant characteristic by the sensor 108 such that the cooling system provides cooling with the coolant to a desired temperature.

The controller 102 may also be communicatively coupled with the oxygen control system 2205, the sensors 2209, and/or the organics control system 2207. As discussed in detail below, the controller 102 is configured to control the oxygen control system 2205 during the decoating process to control an oxygen concentration within the decoating system during the decoating process. In some examples, the controller 102 controls the oxygen control system 2205 based on an oxygen level, gas composition, or other data detected by the sensor 2209. As discussed in detail below, the controller 102 is configured to control the organics control system 2207 during the decoating process to control the concentration of organic compounds within the decoating system during the decoating process. In some examples, the controller 102 controls the organics control system 2207 based on data detected by the sensor 2209.

The sprayer 104 selectively dispenses the coolant into the decoating system during the decoating process. Coolants include, but are not limited to, water, water with oils, halide salts (as a solid coolant or mixed with water or another fluid), air or other cooling gas, and/or various other materials suitable for cooling the decoating system (e.g., for reducing a temperature of gas of the decoating system). The sprayer 104 may be various suitable devices or combination of devices suitable for dispensing the coolant, and the type of sprayer 104 should not be considered limiting on the current disclosure. The sprayer 104 may be positioned at various locations in the decoating system, including, but not limited to, the kiln, the afterburner, the duct between the afterburner and kiln, a subset of these locations, and/or various other locations. In some aspects, a type of sprayer 104 in one location of the decoating system may be different from a type of sprayer 104 in another location of the decoating system, although it need not be.

In some aspects, the sprayer 104 includes a plurality of sprayers 104. Various numbers of sprayers 104 may be provided at different locations within the decoating system, and the number of sprayers at one location may be the same as or different from the number of sprayers at another location of the decoating system. The sprayers 104 are configured to operate at elevated temperatures that may be present during the decoating process. As some non-limiting examples, the sprayers 104 may be operable at temperatures from about 550° C. to about 1000° C., such as from about 800° C. to about 1000° C. In other examples, the sprayers 104 may be operable at temperatures lower than about 550° C. and/or greater than about 1000° C. In various examples, the sprayer 104 may be oriented at various angles with respect to a flow path of heated gas through the decoating system such that the coolant is dispensed at various angles with respect to the flow path. As some non-limiting examples, the sprayer 104 may be oriented to dispense coolant at about 0°, about 1°, about 2°, about 3°, about 4°, about 5°, about 6°, about 7°, about 8°, about 9°, about 10°, about 11°, about 12°, about 13°, about 14°, about 15°, about 16°, about 17°, about 18°, about 19°, about 20°, about 21°, about 22°, about 23°, about 24°, about 25°, about 26°, about 27°, about 28°, about 29°, about 30°, about 31°, about 32°, about 33°, about 34°, about 35°, about 36°, about 37°, about 38°, about 39°, about 40°, about 41°, about 42°, about 43°, about 44°, about 45°, about 46°, about 47°, about 48°, about 49°, about 50°, about 51°, about 52°, about 53°, about 54°, about 55°, about 56°, about 57°, about 58°, about 59°, about 60°, about 61°, about 62°, about 63°, about 64°, about 65°, about 66°, about 67°, about 68°, about 69°, about 70°, about 71°, about 72°, about 73°, about 74°, about 75°, about 76°, about 77°, about 78°, about 79°, about 80°, about 81°, about 82°, about 83°, about 84°, about 85°, about 86°, about 87°, about 88°, about 89°, and/or about 90° with respect to the flow path. In other examples, angles greater than about 90° may be utilized. Moreover, where a plurality of sprayers 104 are provided, a subset of the sprayers 104 may be at an angle that is different from the angle of another subset of the sprayers 104, although they need not be.

The coolant dispensed from the sprayer 104 has a coolant characteristic, and the coolant characteristic is controlled by the coolant control device 106. In some aspects, the coolant characteristic may be various controllable characteristics or combination of characteristics that affect or control the cooling provided by the coolant as it is dispensed into the decoating system. As some non-limiting examples, the coolant characteristic may be a fluid flow rate of the coolant though the sprayer 104, a spray angle of the coolant from the sprayer 104, a pressure at which the coolant is dispensed from the sprayer 104, a pattern in which the coolant is dispensed from the sprayer 104, a position of the sprayer 104 relative to the flow path, an air flow rate of the coolant, a dispensing time period, and/or various other suitable controllable characteristics that affect the cooling provided by the coolant.

In various examples, the coolant control device 106 may be a device or combination of devices suitable for controlling a particular coolant characteristic. As such, a number and/or type of coolant control device 106 should not be considered limiting on the current disclosure. For example, in some cases, the cooling system 100 only controls a single coolant characteristic, and a single type of coolant control device 106 is provided with the system 100. In other examples, the cooling system 100 controls a plurality of coolant characteristics, and a plurality of coolant control devices are provided, each controlling at least one of the plurality of coolant characteristics. In further examples, a coolant control device 106 may control more than one type of coolant characteristic.

As one example of the coolant control device 106, the coolant control device 106 may be a control valve that selectively controls the flow of coolant to the sprayer 104, and the coolant characteristic is the fluid flow rate of the coolant to the sprayer 104. In such examples, the control valve may control the fluid flow rate based on a position of the control valve in the flow path of the coolant that selectively blocks or enables the coolant to flow through the control valve. For example, in some cases, the control valve may be movable to various positions from a fully closed position (at which the control valve blocks coolant flow through the valve, and the fluid flow rate is 0.0 L/min) to a fully open position (at which the control valve allows for a maximum fluid flow rate through the valve). In some aspects, the maximum fluid flow rate through the control valve may be controlled by the controller 102 during cooling, and it need not be the fully open position of the control valve. In various examples, the minimum fluid flow rate through the control valve may be controlled by the controller 102 during cooling, and it need not be the fully closed position or 0.0 L/min. For example, in some cases, the minimum fluid flow rate during cooling is greater than about 0.0 L/min. As one non-limiting example, the minimum fluid flow rate may be about 2.6 L/min. As another non-limiting example, the minimum fluid flow rate may be about 4.9 L/min. In other examples, the minimum fluid flow rate may be less than 2.6 L/min, between 2.6 L/min and 4.9 L/min, or greater than 4.9 L/min, etc. In various non-limiting examples, the maximum fluid flow rate may be about 65 L/min. In other non-limiting examples, the maximum fluid flow rate may be about 40 L/min. However, in other examples, the maximum fluid flow rate may be less than about 40 L/min, between 40 L/min and 65 L/min, or greater than 65 L/min, etc.

As another example of the coolant control device 106, the coolant control device 106 may be a pressure controller, and the coolant characteristic is the pressure at which the coolant is dispensed from the sprayer 104. In such examples, the pressure controller 102 may selectively control the pressure of the coolant (e.g., increasing pressure, decreasing pressure, etc.) such that the coolant is dispensed at a desired pressure. As one non-limiting example, the pressure controller may be controlled by the controller 102 such that the pressure is from about 2.0 kg/cm$^2$ to about 4.0 kg/cm$^2$; however, in other examples, the pressure may be less than about 2.0 kg/cm² or greater than about 4.0 kg/cm².

As a further example of the coolant control device 106, the coolant control device 106 may be a blower (or air mover) and/or an air flow valve, and the coolant characteristic is an air flow rate of a cooling air. In such examples, the cooling air may be provided into the decoating system without requiring the sprayer 104, and cooling with the cooling air may be provided in place of or in addition to the coolant dispensed by the sprayer 104. In such examples where the coolant control device 106 is the blower or air flow valve, the blower or air flow valve selectively controls an air flow rate of the cooling air into the decoating system. As some non-limiting examples, the controller 102 may control the blower or air flow valve such that the air flow rate is from about 127 Nm³/hr. to about 265 Nm³/hr. In other examples, the air flow rate may be less than 127 Nm³/hr. or greater than about 265 Nm³/hr.

In another example of the coolant control device 106, the coolant control device 106 may be an adjustable nozzle of the sprayer 104, and the coolant characteristic is the spray angle of the coolant as the sprayer 104 dispenses it. In such examples, the controller 102 may control a position of the adjustable nozzle such that the spray angle is controlled.

Various other types of coolant control devices 106 may be utilized with the cooling system 100 to control various coolant characteristics.

Referring to FIG. 22, the oxygen control system 2205 may be a device or combination of devices suitable for controlling an oxygen level within the decoating system, such as within the kiln. As one non-limiting example, the oxygen control system 2205 may include an air mover (e.g., a fan) that selectively controls the flow of oxygen that mixes with gas that is injected into the kiln. In such examples, the oxygen control system 2205 may control the oxygen level by selectively controlling the air flow rate, the volume of air, etc. to provide the desired temperature control.

The organics control system 2207 may be a device or combination of devices suitable for controlling the concentration of organic compounds in the gas that is injected into the kiln to control the temperature within the kiln. As one non-limiting example, the organics control system 2207 may be a diverter between the kiln and an afterburner of the decoating system that selectively diverts some of the exhaust gas exiting the kiln back to the kiln.

In various examples, the controller 102 controls the various components of the cooling system 100 (or the cooling system 2200) for the decoating system during a decoating process to control the temperature within the decoating system.

Referring to FIGS. 1 and 22, in various examples, during the decoating process, the temperature sensor 110 measures the temperature in at least one of the kiln, the afterburner, and the duct between the afterburner of the kiln of the decoating system. In certain examples, a plurality of temperature sensors 110 are provided, and the temperature is measured at more than one location within the decoating system. In some examples, the controller 102 receives the temperature that is measured by the temperature sensor 110. The controller 102 may receive the measured temperature continuously, at various predetermined intervals, or various combinations thereof.

During the decoating process, the sensor 108 measures the coolant characteristic of the coolant as it is dispensed into the decoating system. In certain cases, the sensor 108 measures the coolant characteristic of the coolant as it is dispensed by the sprayer 104, although it need not. In various examples, the sensor 108 may measure at least one of the fluid flow rate of the coolant, the fluid pressure, the spray angle of the coolant, the air flow rate, and/or various other coolant characteristics or combination of characteristics. The controller 102 receives the coolant characteristic that is measured by the sensor 108, and may receive the measured coolant characteristic continuously, at various predetermined intervals, or various combinations thereof.

In various examples, the controller 102 determines whether the measured temperature by the temperature sensor 110 is at or within a predetermined range of a desired decoating operating temperature. In some cases, the desired decoating operating temperature may be from about 200° C. to about 1000° C., depending on a particular location within the decoating system where the temperature is measured. For example, a desired operating temperature within the afterburner may generally be higher than the desired operating temperature within the kiln, although it need not be. In other examples, the desired decoating operating temperature may be less than 200° C. or greater than 1000° C.

In various cases, the controller 102 determines the cooling provided with the coolant based on the measured coolant characteristic. In some aspects, determining the cooling includes determining whether the measured temperature will be maintained, increased, and/or decreased based on the measured coolant characteristic.

In certain aspects, based on the comparison of the measured temperature with the desired decoating operating temperature, and/or based on the measured coolant characteristic, the controller 102 adjusts or controls the coolant control device 106 to adjust or control the coolant characteristic such that the cooling system provides cooling to a desired decoating operating temperature. In some aspects, the controller 102 may adjust the coolant control device based only on the comparison of the measured temperature with the desired decoating operating temperature or based only on the measured coolant characteristic.

As one non-limiting example, the coolant characteristic is a fluid flow rate of the coolant, and the coolant control device 106 is a control valve that selectively enables fluid flow of the coolant to the sprayer 104. In this example, the controller 102 may adjust the coolant control device 106 by selectively positioning the control valve at a position from a fully closed position to a fully open position to control the fluid flow rate based on the measured temperature and the measured coolant characteristic (i.e., a measured fluid flow rate). In some examples, the controller 102 adjusts the coolant control device 106 by positioning the control valve such that the fluid flow rate is from a minimum fluid flow rate to a maximum fluid flow rate based on the measured temperature and the measured fluid flow rate. Optionally, the minimum fluid flow rate is greater than 0.0 L/min.

As another non-limiting example, the coolant characteristic is a fluid pressure of the coolant and the coolant control device 106 is a pressure control device. In this example, the controller 102 may adjust the coolant control device 106 by selectively controlling the fluid pressure of the coolant with the pressure control device based on the measured temperature and the measured fluid pressure. As a further non-limiting example, the coolant characteristic is a spray angle of the coolant, the coolant control device is a nozzle of the sprayer 104, and the controller 102 adjusts the coolant control device 106 by selectively positioning the nozzle to adjust the spray angle based on the measured temperature and the measured spray angle. In another non-limiting example, the coolant characteristic is an air flow rate, the coolant control device 106 is an air flow valve, and the controller 102 adjusts the coolant control device 106 by selectively positioning the air flow valve to control the air flow rate through the air flow valve to the sprayer 104.

Referring to FIG. 22, in certain examples, controlling the cooling system 2200 may include controlling the oxygen control system 2205 and/or the organics control system 2207. In some examples, during the decoating process, the sensor(s) 2209 detect at least one characteristic of gas flowing through the decoating system. In some cases, the sensor(s) 2209 detect at least one of an oxygen level, an organic composition in the gas, or other suitable characteristics of the gas. The sensor(s) 2209 may detect the characteristic of the gas at various suitable locations including, but not limited to, within the kiln, within the afterburner, within the duct between the kiln and the afterburner, within the duct between the afterburner and the kiln, or other suitable locations. The controller 102 may receive the data detected by the sensor(s) 2209.

In various cases, the controller 102 determines the temperature control provided based on the measured gas characteristic. In some aspects, determining the temperature includes determining whether the measured temperature will be maintained, increased, and/or decreased based on the measured gas characteristic.

In certain aspects, based on the comparison of the measured temperature with the desired decoating operating temperature, and/or based on the measured gas characteristic, the controller 102 adjusts or controls the oxygen control system 2205 and/or the organics control system 2207 to adjust or control the gas characteristic. In some aspects, the controller 102 may adjust the coolant control device based only on the comparison of the measured temperature with the desired decoating operating temperature or based only on the measured gas characteristic.

As one non-limiting example, the gas characteristic may be an oxygen level or percentage of the gas that is supplied to the kiln, and the oxygen control system 2205 includes an air mover that selectively controls the flow of oxygen to the gas that is supplied to the kiln. In this example, the controller 102 may adjust the oxygen control system 2205 to increase or decrease the flow and/or volume of oxygen that mixes with the gas that is supplied to the kiln based on the measured temperature and/or the measured gas characteristic.

As another non-limiting example, the gas characteristic may be a concentration of organic compounds of the gas that is supplied to the kiln, and the organics control system 2207 includes a diverter that selectively enables fluid flow of the exhaust gas from the kiln to mix with the gas that is supplied to the kiln. In this example, the controller 102 may adjust the organics control system 2207 by selectively positioning the diverter at a position from a fully closed position to a fully open position to control the flow of the exhaust gas from the kiln to mix with the gas that is supplied to the kiln based on the measured temperature and/or the measured gas characteristic. In certain optional examples, the controller 102 may selectively position the diverter at a position from about 50% open to 100% open (i.e., fully open) to further limit the accumulation of organic compounds in the kiln.

Figure 2:
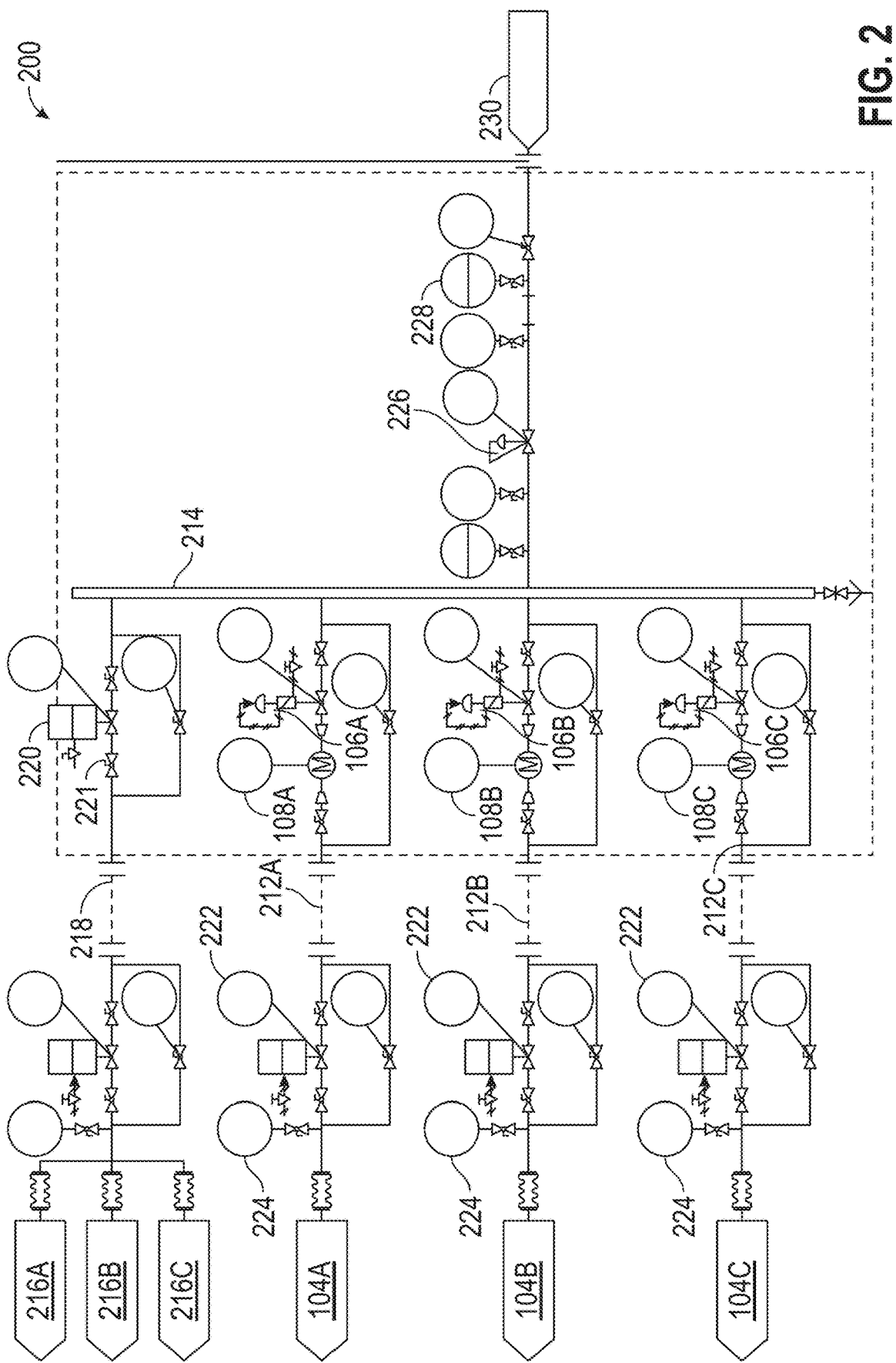
FIG. 2 is a schematic diagram of a cooling system for a decoating system according to aspects of the present disclosure.
Figure 3:
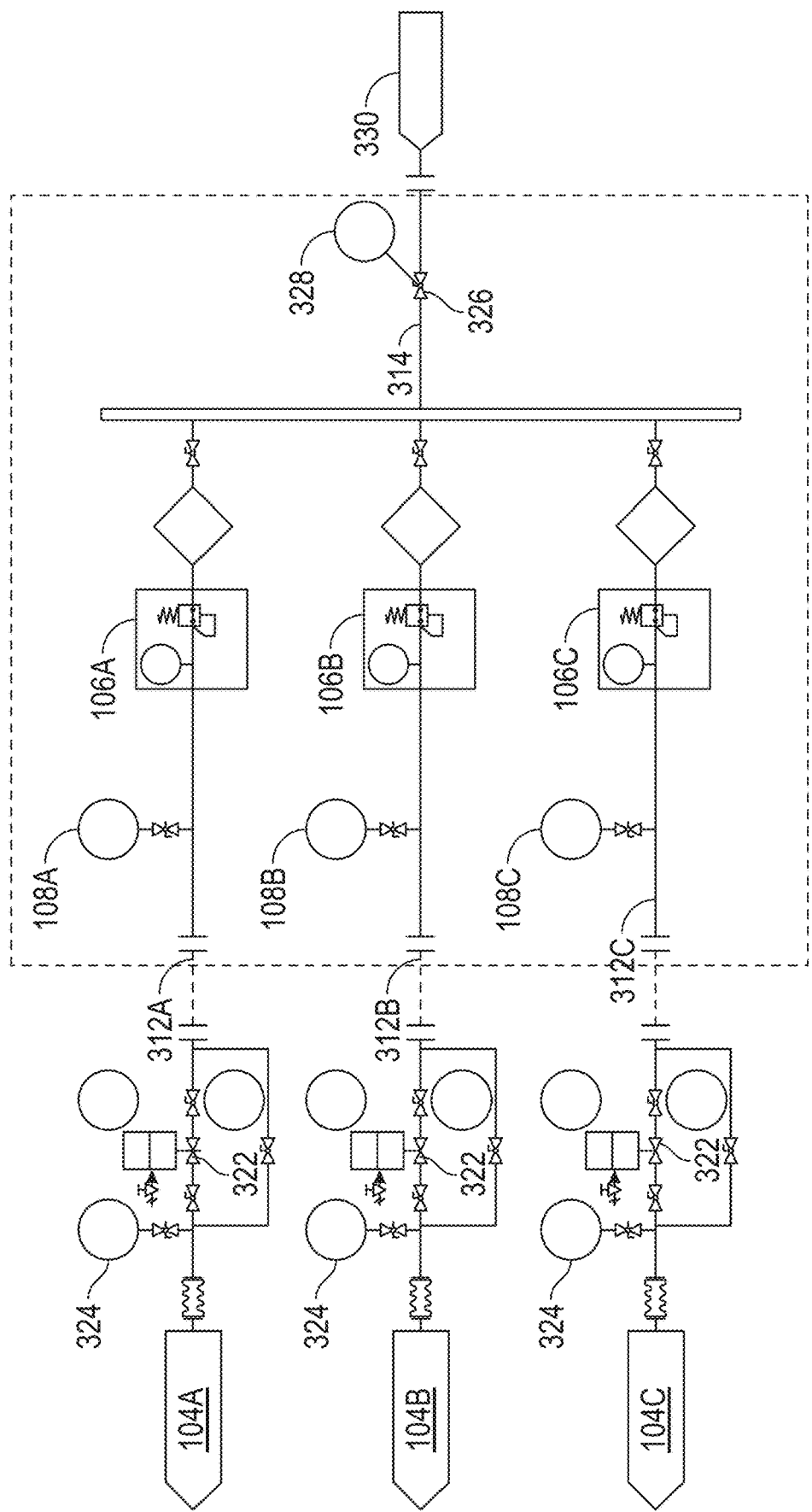
FIG. 3 is a schematic diagram of a cooling system for a decoating system according to aspects of the present disclosure.
Figure 4:
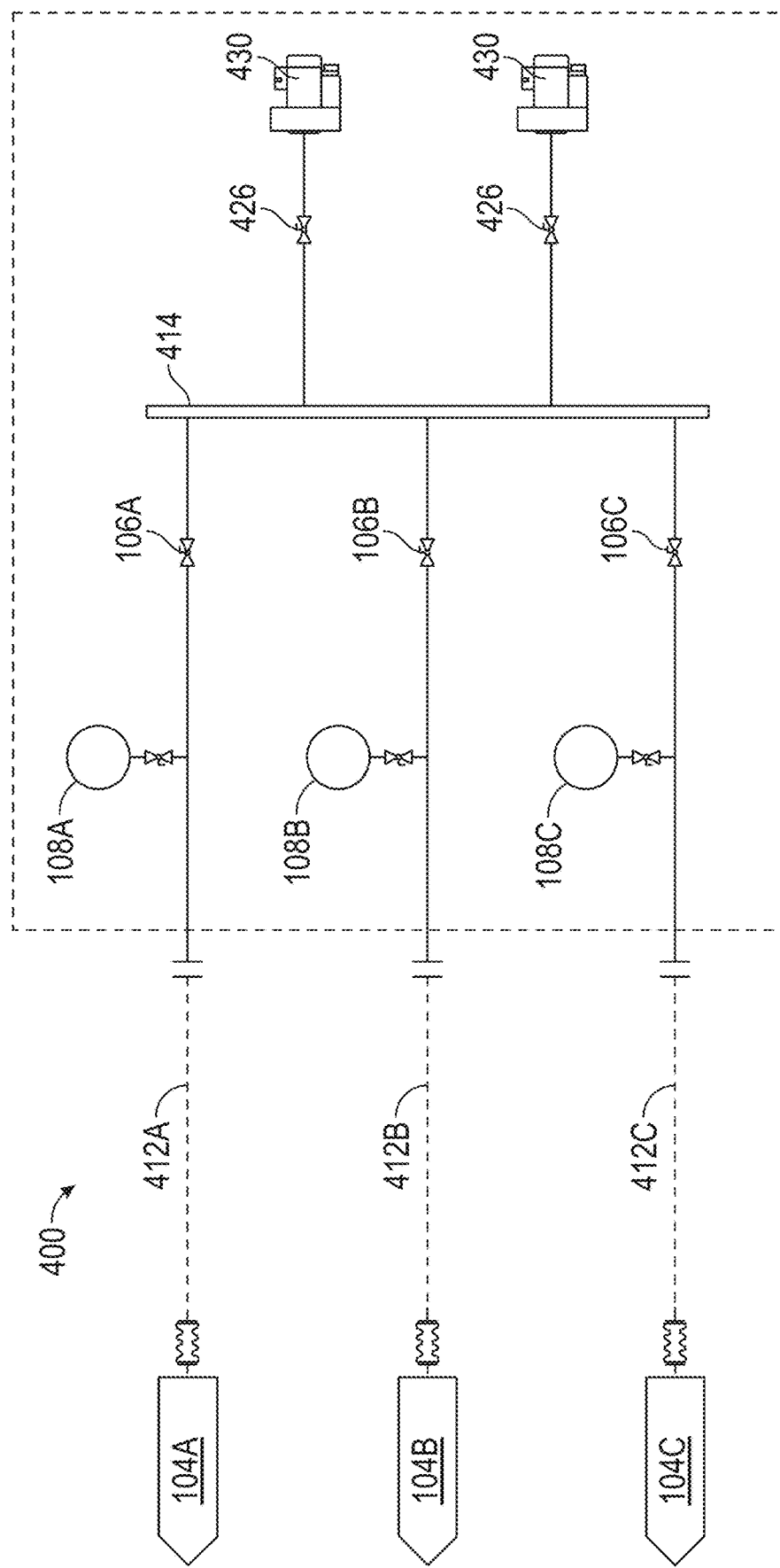
FIG. 4 is a schematic diagram of a cooling system for a decoating system according to aspects of the present disclosure.

FIGS. 2-4 illustrate various examples of cooling systems wherein the cooling characteristic is a fluid flow rate (FIG. 2), a fluid pressure (FIG. 3), and an air flow rate (FIG. 4). Although illustrated as separate cooling systems, it will be appreciated that in various examples, the cooling systems of FIGS. 2-4 (or a subset thereof) may be provided as a single cooling system that controls a plurality of cooling characteristics.

FIG. 2 illustrates a cooling system 200 that is substantially similar to the cooling system 100. In the example of FIG. 2, the cooling system 200 includes three sprayers 104A-C, and each sprayer 104 has a dedicated coolant flow line 212A-C from a general coolant flow line 214. As illustrated, each coolant flow line 212A-C has a coolant control device 106A-C (e.g., a control valve) and a sensor 108A-C such that the fluid flow rate to each sprayer 104A-C can be measured and controlled independently. In various aspects, the coolant control devices may include solenoid valves with limit switches, and/or may be various other suitable types of coolant control devices. In various aspects, at least one coolant control device is provided just before and/or proximate to one or more of the sprayers 104A-C such that it can keep coolant inside the upstream piping available for starting spraying anytime needed at the required pressure. For example, some of the sprayers are installed below the water piping, and without this coolant control device just before the sprayer, the coolant in the piping below the sprayer and the piping header will be drained into the sprayer. In such cases, when spraying should be started, there may be a delay in spraying and temperature control because there is no water between the sprayer and the piping header. In other examples, the coolant control device may be provided in additional or alternative locations.

In some optional examples, and as illustrated in FIG. 2, each coolant flow line 212A-C includes additional coolant control devices 222 and/or sensors 224. In various optional examples, the general coolant flow line 214 also includes one or more coolant control devices 226 and/or sensors 228 such that the coolant characteristic can be measured and controlled for one or more sprayers as it flows from a coolant supply 230 to the sprayers. In some cases, the sensors 228 may detect a characteristic of the coolant that is different from the sensors 108. As one non-limiting example, the sensors 228 may detect pressure, and the sensors 108 may detect flow rate.

In certain optional examples, the cooling system 200 includes supplemental sprayers 216A-C, which may also dispense the coolant. In certain cases, the supplemental sprayers 216A-C may be provided for emergency coolant spraying into a kiln discharge chute when the chute is plugged or jammed. In some cases, once the kiln discharge chute is plugged or jammed, the hot decoated scrap quickly builds up and the scrap may partially melt. In such cases, the supplemental sprayers 216A-C may be provided to cool the scrap and/or prevent or reduce melting. In other examples, the supplemental sprayers 216A-C may be provided at various other locations within the decoating system as desired.

As illustrated in FIG. 2, in some examples, a single supplemental spray line 218 is provided for all of the sprayers 216A-C, and the supplemental spray line 218 has a supplemental coolant control device 220 and a supplemental sensor 221 such that the fluid flow rate to the sprayers 216A-C is jointly controlled. In other aspects, each sprayer 216A-C may have a dedicated flow line, similar to the sprayers 104A-C. In other examples, the sprayers 104A-C may have a configuration similar to the sprayers 216A-C (i.e., a single coolant control device and a single sensor control the coolant characteristic for all of the sprayers 104). Various other configurations of the sprayers, coolant control devices, and/or sensors may be provided.

FIG. 3 illustrates a cooling system 300 that is substantially similar to the cooling system 200, except that the cooling characteristic is a fluid pressure, and the coolant control devices 106A-C are pressure controllers. In the example of FIG. 3, each sprayer 104A-C has a dedicated pressure supply line 312A-C from a general pressure supply line 314. As illustrated, each pressure supply line 312A-C has the coolant control device 106A-C (e.g., pressure controller) and a sensor 108A-C such that the pressure to each sprayer can be measured and controlled independently for each sprayer. In other examples, a coolant control device and/or sensor may control the coolant characteristic for more than one sprayer.

Similar to the cooling system 200, in some optional examples, each pressure supply line 312A-C includes additional coolant control devices 322 and/or sensor 324. In various optional examples, the general pressure supply line 314 also includes one or more coolant control devices 326 and/or sensors 328 such that the coolant characteristic can be measured and controlled for one or more sprayers as it flows from a pressure supply 330 to the sprayers. In the example of FIG. 3, optionally, the supplemental sprayers are omitted and/or a pressure supply line is not provided to supplemental sprayers. In other examples, supplemental sprayers with pressure supply lines and the corresponding control devices and sensors may be provided.

FIG. 4 illustrates a cooling system 400 that is substantially similar to the cooling system 200, except that the cooling characteristic is an air flow rate, and the coolant control devices 106A-C are air control valves. Optionally, an air supply device 430 (e.g., blowers, air movers, etc.) may also be controlled by the controller. In other examples, additional coolant control devices may be provided in addition to the air supply device 430. In the example of FIG. 4, each sprayer 104A-C has a dedicated air flow line 412A-C from a general air flow line 414. As illustrated, each air flow line 412A-C has the coolant control device 106A-C (e.g., air flow valve) and a sensor 108A-C such that the air flow can be measured and controlled independently for each sprayer. In other examples, a coolant control device and/or sensor may control the coolant characteristic for more than one sprayer.

Similar to the cooling system 200, the general air flow line 414 optionally includes one or more coolant control devices 426 and/or sensors such that the coolant characteristic can be measured and controlled for one or more sprayers as it flows from the air supply device 430 to the sprayers.

Figure 5:
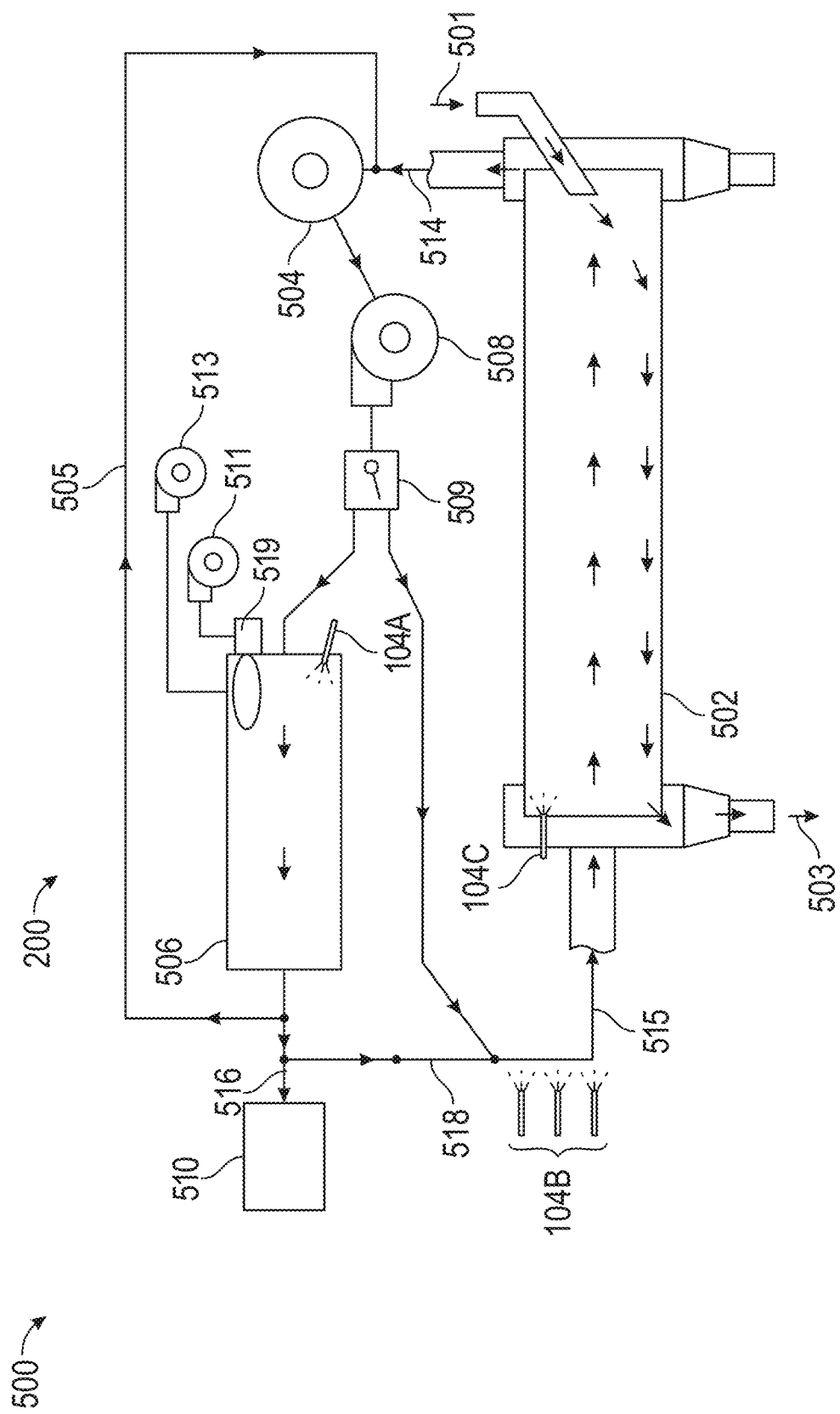
FIG. 5 is a schematic diagram of a decoating system including the cooling system of FIG. 2 according to aspects of the present disclosure.

FIG. 5 illustrates the cooling system 200 with a decoating system 500. For simplicity and clarity of FIG. 5, only the sprayers 104A-C of the cooling system 200 are illustrated. The decoating system 500 is provided for illustrative purposes only, and should not be considered limiting on the current disclosure.

During a decoating process, the decoating system 500 removes coatings and other organic contaminants from metal scrap, such as aluminum or aluminum alloys, according to aspects of the present disclosure. The decoating system 500 generally includes a kiln 502, a cyclone 504 (or other suitable solid/gas separator), and an afterburner 506. Other components such as a recirculation fan 508, a diverter 509, a heat exchanger 510, and an exhaust system may also be included as part of the decoating system 500. As illustrated in FIG. 5, the decoating system 500 further includes the cooling system 200.

During a decoating process with the decoating system 500, metal scrap 501 is fed into the kiln 502. Heated gas 515 is injected into the kiln 502 to raise the temperature within the kiln 502 and vaporize the organic matter without melting the scrap metal. In many cases, the oxygen concentration within the decoating system 500 is maintained at a low level (such as from about 6% to about 8% oxygen) such that the organic materials do not ignite. For example, within the decoating system, the atmosphere may be 7% oxygen such that the organic compounds do not ignite even though they are at elevated temperatures due to the decoating process. The decoated scrap metal 503 is removed from the kiln 502 for further processing and ultimately processing into new aluminum products.

Exhaust gas containing the vaporized organic compounds (sometimes referred to as "VOCs") exits the kiln 502 through a duct 514, which connects the kiln 502 to the cyclone 504. Within the cyclone 504, larger organic compound particulates are removed from the exhaust gas as dust and ultimately discharged from the cyclone 504 for disposal. From the cyclone 504, the exhaust gas is directed into the afterburner 506. Optionally, some of the exhaust gas from the cyclone 504 may be diverted by the diverter 509 and may bypass the afterburner 506. The afterburner 506 incinerates the remaining organic compounds within the exhaust gas, and discharges a heated gas into a duct 516 that leads to the heat exchanger 510 and exhaust system (e.g., a baghouse) or the atmosphere. Optionally, some of the heated gas discharged by the afterburner 506 can be fed into the kiln 502 and optionally mix with the gas diverted by the diverter 509. The afterburner 506 may include a hot air burner 519 or other suitable device for heating the gas. The temperature of the heated gas within the duct 516 is greater than the temperature of the exhaust gas from the kiln 502 within the duct 514. For example, in various cases, the temperature of the exhaust gas within the duct 514 is generally from about 250° C. to about 400° C., while the temperature of the heated gas within the duct 516 is generally from about 700° C. to about 900° C. In some examples, some of the heated gas exiting the afterburner 506 is optionally recirculated back to the kiln 502 through a recirculation duct 518. In various examples, and as described in detail below, sprayers 104A-C of the cooling system 200 may be provided to cool a temperature of the heated gas from the afterburner 506 before the gas is recirculated back to the kiln 502. Sprayers 104A-C may also be provided in the afterburner 506 and/or in the kiln 502 to provide selective cooling within the decoating system 500.

In some examples, the exhaust gas exiting the afterburner 506 through the duct 516 is directed through the heat exchanger 510 that reduces a temperature of the exhaust gas. In various examples, some of the cooled exhaust air exiting the heat exchanger 510 may be recirculated through an air mover back to the kiln 502. In such examples, the air mover may optionally be an air supply when the coolant characteristic is an air flow rate. Alternatively or additionally, some of the cooled exhaust air exiting the heat exchanger 510 may be recirculated through an air mover back to the afterburner 506 as cooling air 505 to aid in controlling the atmosphere within the afterburner 506. In such examples, the air mover may optionally be an air supply when the coolant characteristic is an air flow rate. In various examples, additional air movers 513 and 511 are provided to supply oxygen (air mover 513) and combustion air (air mover 511) to control the atmosphere within the afterburner 506.

In some aspects, during the decoating process, the concentration of organic compounds within the decoating system increases, which may lead to dangerous situations within the system. For example, organic compounds reintroduced into the kiln 502 can release heat energy into the kiln 502, which raises temperatures inside the kiln 502 and may result in thermitting (burning of metal inside the kiln 502) or other serious damage to the decoating system equipment.

As described above with reference to FIGS. 1 and 2, the cooling system 200 is configured to provide selective cooling at various locations within the decoating system 500 (e.g., within the afterburner 506, duct 518, kiln 502, etc.) to reduce or prevent thermitting (or other dangerous conditions). In the example of FIG. 5, sprayers 104A-C are provided in the afterburner 506, duct 518, and kiln 502, respectively. Although not illustrated in FIG. 5, corresponding sensors 108 and temperature sensors 110 may also be provided in the afterburner 506, duct 518, and kiln 502. As described above with reference to FIGS. 1 and 2, based on the temperature measured within the decoating system 500 and/or the measured coolant characteristic, the controller (not shown in FIG. 5) controls the coolant control devices (not shown in FIG. 5) to adjust the coolant characteristic such that the cooling system 200 provides cooling with the coolant to a desired operating temperature for the particular location within the decoating system 500.

Figure 6:
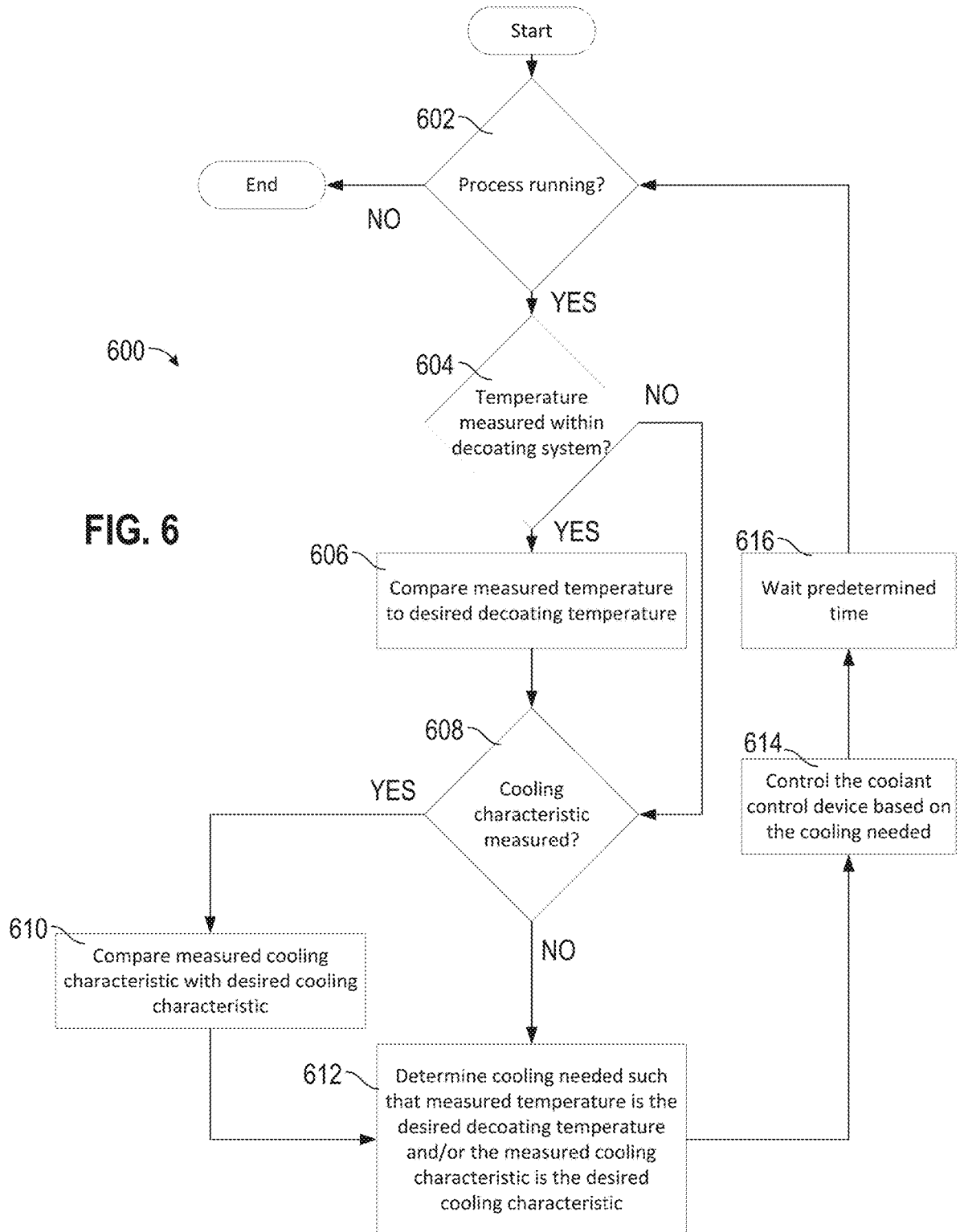
FIG. 6 is a flowchart depicting a cooling control process for a decoating system according to aspects of the present disclosure.

FIG. 6 is a flowchart illustrating a method of controlling cooling within the decoating system according to various examples. In some cases, at a block 602, the controller determines whether the decoating system and/or cooling system are running. If the cooling system and/or decoating system are not running, the process may end.

In a block 604, the method may include determining whether a temperature is measured within the decoating system. If the temperature is measured within the decoating system, in a block 606, the controller compares the measured temperature with the desired decoating temperature. In a block 608, after comparing the measured temperature with the desired temperature, or if the temperature is not measured, the method may include determining whether a cooling characteristic is measured. In a block 610, if the method may include comparing the measured cooling characteristic with a desired cooling characteristic. In a block 612, after comparing the measured cooling characteristic with the desired cooling characteristic, or if the cooling characteristic is not measured, the method includes determining the cooling needed such that the measured temperature is the desired decoating temperature and/or such that the measured cooling characteristic is the desired cooling characteristic. In a block 614, the controller controls the coolant control device based on the cooling needed such that the measured temperature is the desired decoating temperature and/or such that the measured cooling characteristic is the desired cooling characteristic. Optionally, in a block 616, the process may wait for a predetermined time before returning to block 602.

Figure 7:
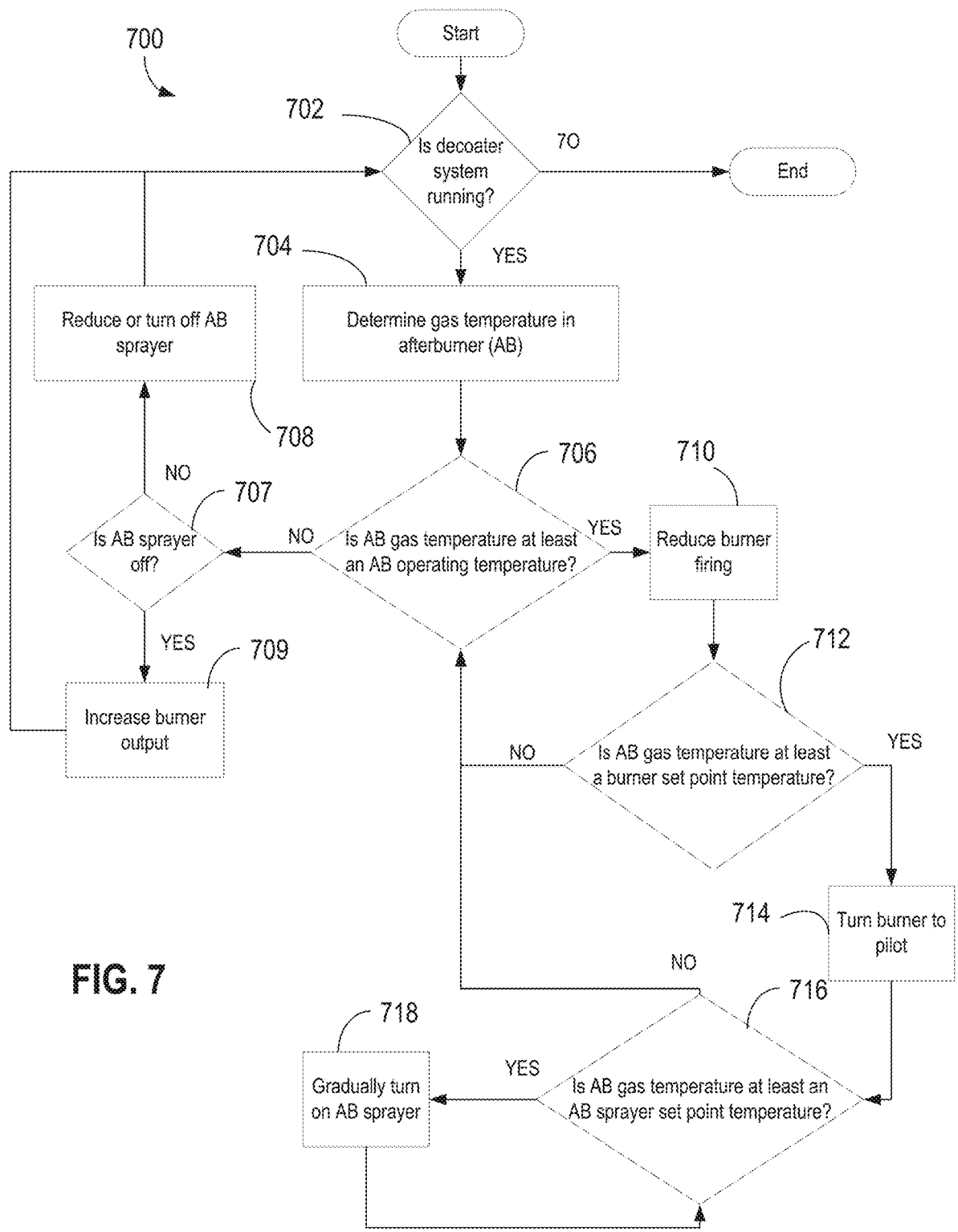
FIG. 7 is a flowchart depicting a cooling control process for a decoating system according to aspects of the present disclosure.
Figure 8:
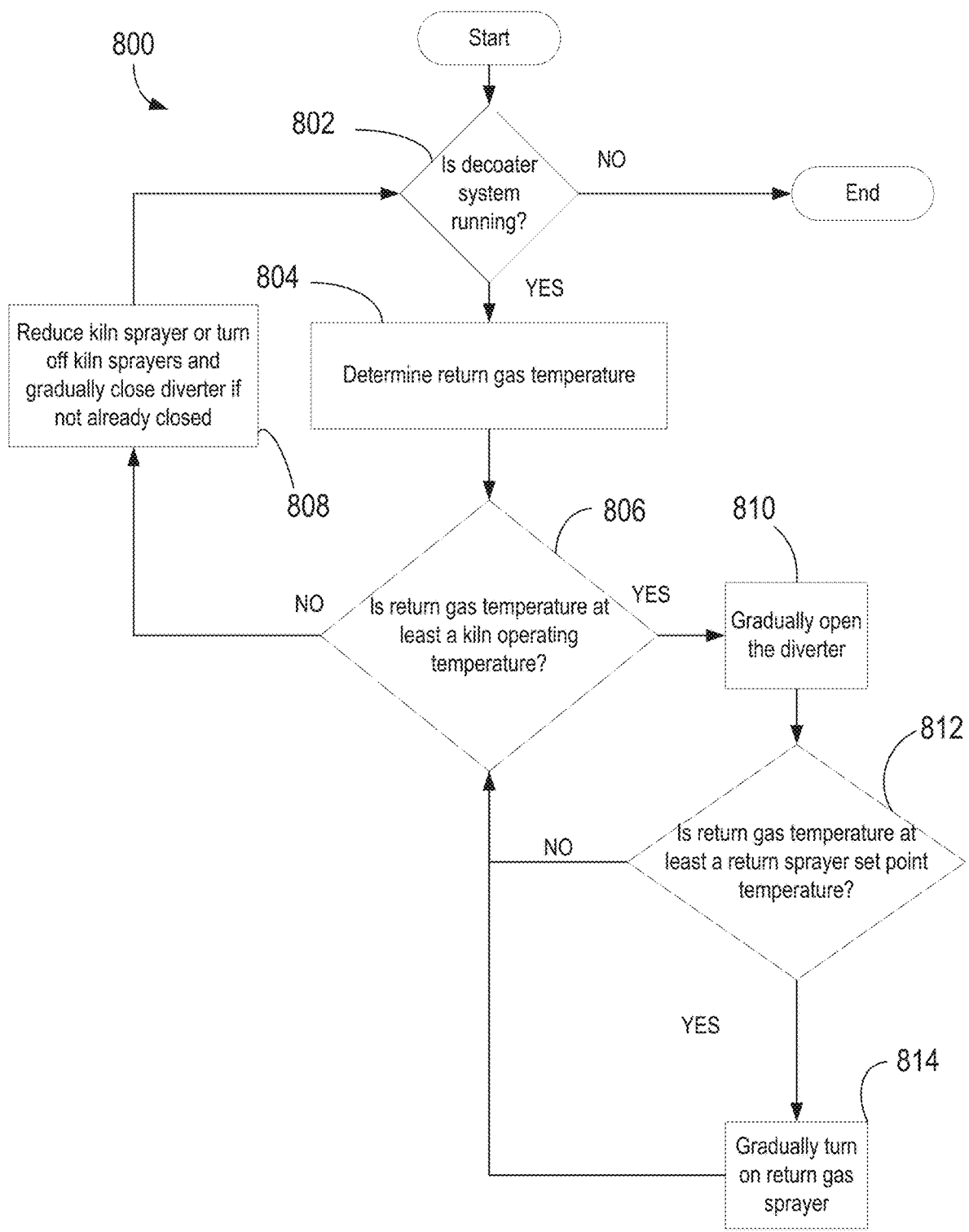
FIG. 8 is a flowchart depicting a cooling control process for a decoating system according to aspects of the present disclosure.
Figure 9:
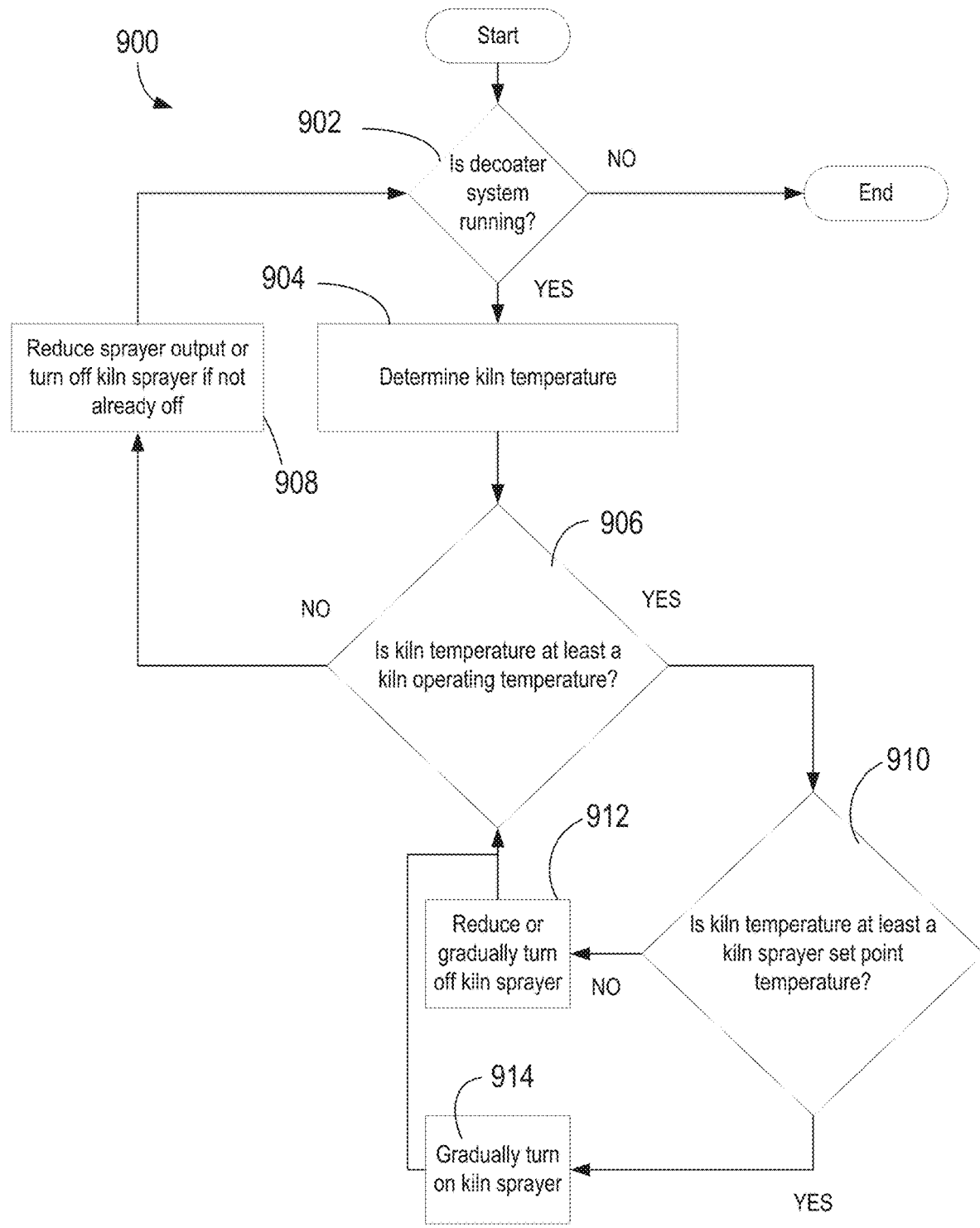
FIG. 9 is a flowchart depicting a cooling control process for a decoating system according to aspects of the present disclosure.

FIGS. 7-9 are flowcharts showing examples of additional methods of controlling the temperature within the decoating system with the cooling system. The methods are described with reference to the decoating system 500; however, it will be appreciated that such methods could be used to control the cooling in various other decoating systems. FIG. 7 shows an example of a method 700 of controlling the gas temperature in the afterburner 506 with the cooling system 200. FIG. 8 shows an example of a method 800 of controlling the temperature of the return gas that is used in the kiln 502. FIG. 9 shows an example of a method 900 of controlling the temperature in the kiln 502. In various cases, the methods 700, 800, and 900 may be performed together or selectively as desired.

Referring to FIG. 7, in block 702 of the method 700 for controlling the temperature of the afterburner 506, a controller determines if the decoating system 500 is in operation. In various examples, unless the decoating system 500 is running, the process ends. In block 704, the temperature of the gas in the afterburner 506 is determined. In various examples, the temperature of the gas in the afterburner 706 is sensed through one or more temperature sensors, such as a sensor 108. In some examples, the temperature sensors are within the afterburner 506. Additionally or alternatively, in other examples, temperature sensors measure the temperature of the gas as it exits the afterburner 506.

In block 706, the controller determines whether the temperature detected in block 704 is at least an afterburner operating temperature. In various examples, the afterburner operating temperature is from about 700° C. to about 1000° C., such as about 800° C.+/−20° C. In one non-limiting example, the afterburner operating temperature is about 800° C.

In block 707, if the controller determines in block 706 that the afterburner temperature is not at least the afterburner operating temperature, the controller determines whether the sprayer 104A for the afterburner 506 is off. In block 709, if the controller determines in block 707 that the sprayer 104A is not off, the controller reduces the sprayer 104A and/or turns off the sprayer 104A if it is not already off and returns to block 702. In block 709, if the controller determines in block 707 that the sprayer 104A is off, the controller increases the burner output and returns to block 702.

In block 710, if the controller determines in block 706 that the afterburner temperature is at least the afterburner operating temperatures, the controller gradually reduces burner firing of a burner of the afterburner 506. In block 712, the controller then determines if the afterburner temperature is at least a burner set point temperature. In various examples, the burner set point temperature is a temperature greater than the afterburner operating temperature and less than an afterburner sprayer set point temperature. In some non-limiting examples, the burner set point temperature is about 800° C. to about 810° C., although various other temperature ranges may be provided. If the controller determines that the afterburner gas temperature is not at least the burner set point temperature, the process returns to block 706. If the controller determines in block 712 that the afterburner temperature is at least the burner set point temperature, the controller reduces the burner to a pilot setting such that a stable minimum is retained to safely ignite the organic vapors and prevent explosions in block 714. Optionally, the controller turns off the burner in block 714.

In block 716, the controller determines whether the afterburner temperature is at least an afterburner sprayer set point temperature. In various examples, the afterburner sprayer set point temperature is greater than the afterburner operating temperature. In one non-limiting example, the afterburner set point temperature is about 820° C., although various other temperatures may be used. If the controller determines that the afterburner temperature is not at least the afterburner sprayer set point temperature, the process returns to block 706. If the controller determines that the afterburner temperature is at least the afterburner sprayer set point temperature, in block 718, the controller gradually turns on the sprayer 104A and returns to block 716.

Referring to FIG. 8, in block 802 of the method 800 for controlling the temperature of the return gas entering the kiln 502, the controller determines if the decoating system 500 is in operation. Similar to the method 800, unless the decoating system 500 is running, the process ends. In block 804, the temperature of the return gas is sensed through temperature sensors, such as sensor 108. In block 806, the controller determines whether the return gas temperature detected in block 804 is at least a kiln operating temperature. In various examples, the kiln operating temperature is from about 200° C. to about 600° C., such as about 550° C.+/−20°

C. For example, in one non-limiting case, the kiln operating temperature is about 550° C. In block 808, if the controller determines in block 806 that the return gas temperature is not above the kiln operating temperature, the controller reduces the sprayer output and/or turns off all of the sprayers if they are not already off, optionally closes the diverter 509 (if it is included) if it is not already closed, and then returns to block 802.

In block 810, if the controller determines in block 806 that the return gas temperature is at least the kiln operating temperature, the controller gradually opens the diverter 509 such that more bypass gas is diverted from the main gas flow exiting the kiln 502 rather than being fed into the afterburner 506. In block 812, the controller determines whether the return gas temperature is at least a return sprayer set point temperature. In various examples, the return sprayer set point temperature is greater than the kiln operating temperature. For example, in one non-limiting case, the return sprayer set point temperature is about 570° C., although various other temperatures may be used. If the controller determines that the return gas temperature is not at least the return sprayer set point temperature, the process returns to block 806. If the controller determines that the return gas temperature is at least the return gas set point temperature, in block 814, the controller gradually turns on the sprayer 104B, and then proceeds to block 806.

Referring to FIG. 9, in block 902 of the method 900 for controlling the temperature of the kiln 502, the controller determines if the decoating system 500 is in operation. In various examples, similar to the methods 700 and 800, unless the decoating system 500 is running, the process ends. In block 904, the temperature of the kiln 502 is sensed through temperature sensors, such as sensor 108.

In block 906, the controller determines whether the kiln temperature detected in block 904 is at least the kiln operating temperature. In block 908, if the controller determines in block 906 that the kiln temperature is not at least the kiln operating temperature, the controller reduces the sprayer output and/or turns off the sprayer 104C in the kiln 502 if it is not already off, and returns to block 902. In block 910, if the controller determines that the kiln temperature is at least the kiln operating temperature, the controller determines whether the kiln temperature is at least a kiln sprayer set point temperature. In various examples, the kiln sprayer set point temperature is greater than the kiln operating temperature. For example, in one non-limiting case, the kiln sprayer set point temperature is about 570° C., although various other temperatures may be used.

In block 912, if the kiln temperature is not at least the kiln sprayer set point temperature, the controller reduces and/or gradually turns off the sprayer 104C if it is on, and returns to block 906. In block 914, if the kiln temperature is at least the kiln sprayer set point temperature, the controller gradually turns on the sprayer 104C or further opens the 104C if it is already on, and returns to block 906.

In other examples, controlling the return gas temperature includes continuously using the sprayers 104A-C, and selectively using the diverter 509 as needed, to further control the return gas temperature. In various other examples, controlling the return gas temperature includes continuously using the diverter 509 to direct the bypass gas to mix with the return gas, and selectively using the sprayers 104A-C as needed to further control the return gas temperature. Numerous other configurations of using the diverter 509 and/or sprayers 104A-C may be implemented.

Figure 10:
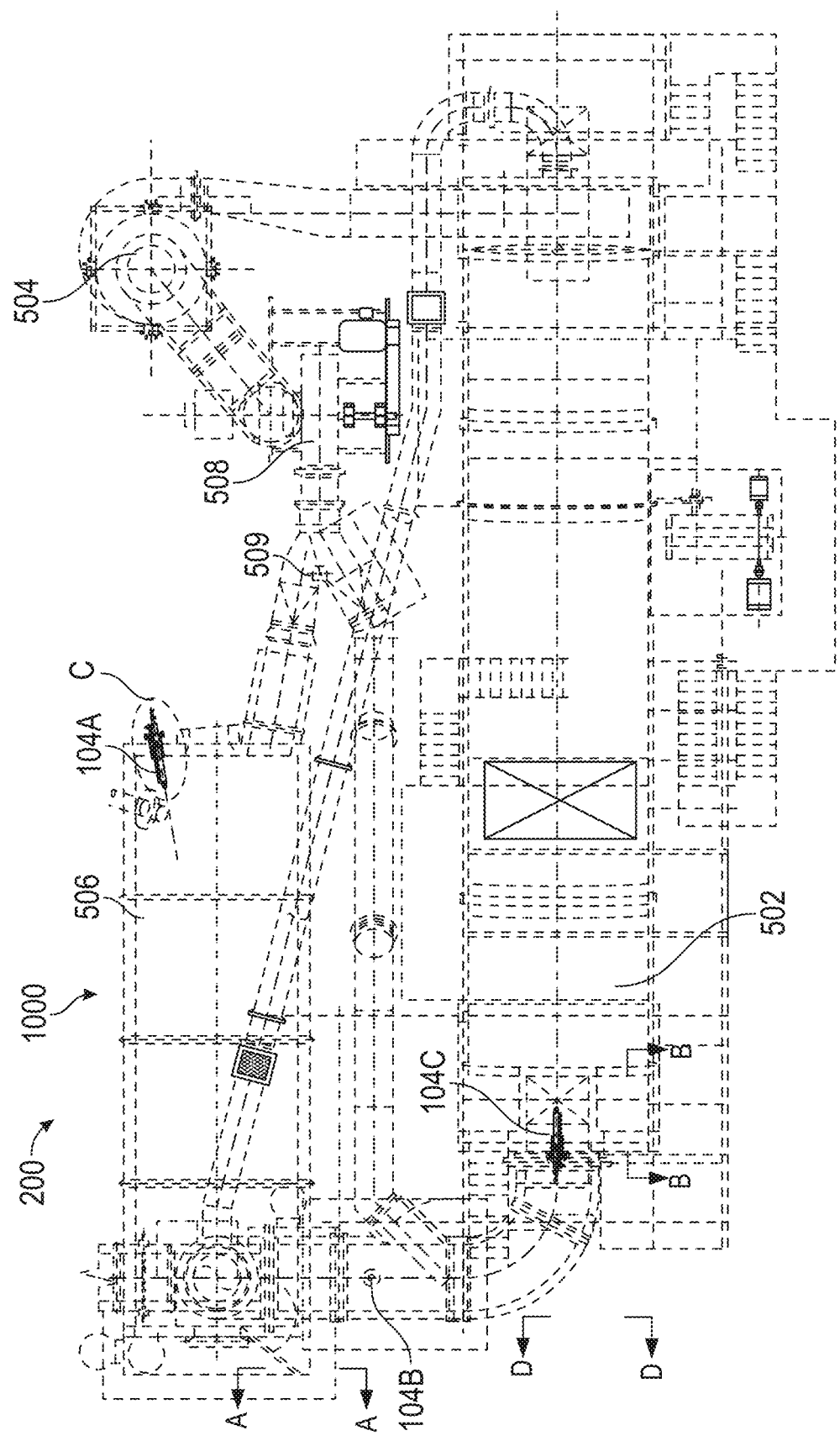
FIG. 10 is another diagram of a decoating system including the cooling system of FIG. 2 according to aspects of the present disclosure.

FIGS. 10-15 illustrate another example of the cooling system 200 with a decoating system 1000. In various aspects, the decoating system 1000 is substantially similar to the decoating system 500. In FIG. 10, the components of the cooling system 200 are illustrated in solid lines and the other components of the decoating system 1000 are illustrated in dashed lines to clarify exemplary locations of the cooling system 200 components within the decoating system 1000.

Figure 18:
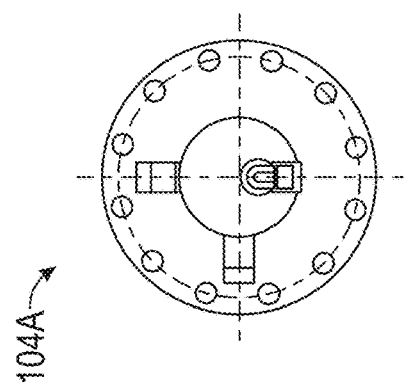
FIG. 18 is a rear view of the sprayer of FIG. 16.
Figure 17:
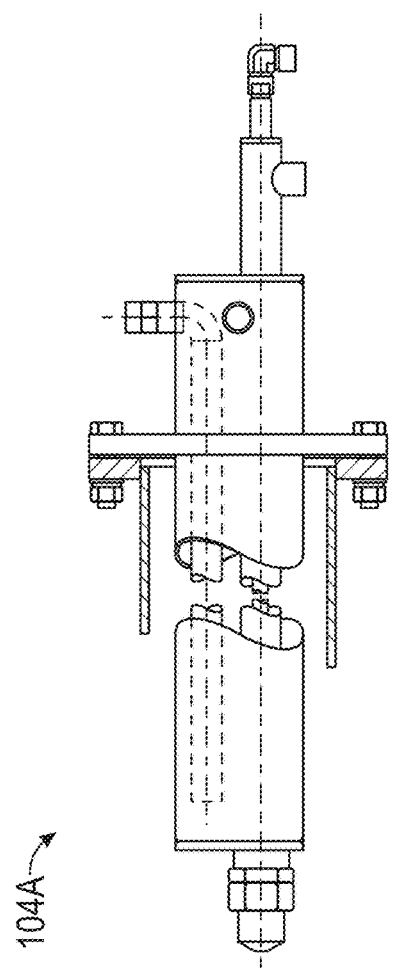
FIG. 17 is a side view of the sprayer of FIG. 16.
Figure 16:
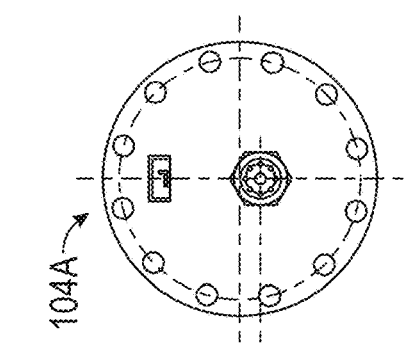
FIG. 16 is a front view of a sprayer of a cooling system according to aspects of the current disclosure.

FIGS. 16-18 illustrate an example of a sprayer for the cooling system 200, such as the sprayer 104A. In this example, a nozzle of the sprayer is configured to dispense the coolant along an axis that is substantially parallel with a central axis of the sprayer. In other examples, the nozzle of the sprayer may be oriented at various other angles relative to the central axis of the sprayer, and it need not be substantially parallel. It will be appreciated that in other examples, the sprayer 104A could have other configurations and/or other sprayers may have the configuration illustrated in FIGS. 16-18.

Figure 21:
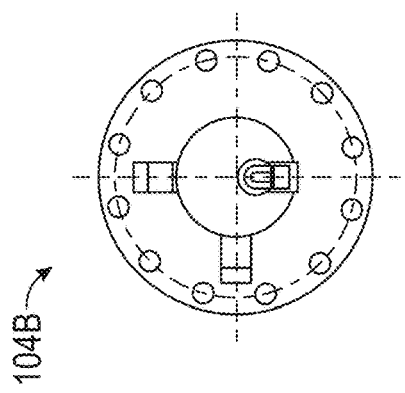
FIG. 21 is a rear view of the sprayer of FIG. 19.
Figure 20:
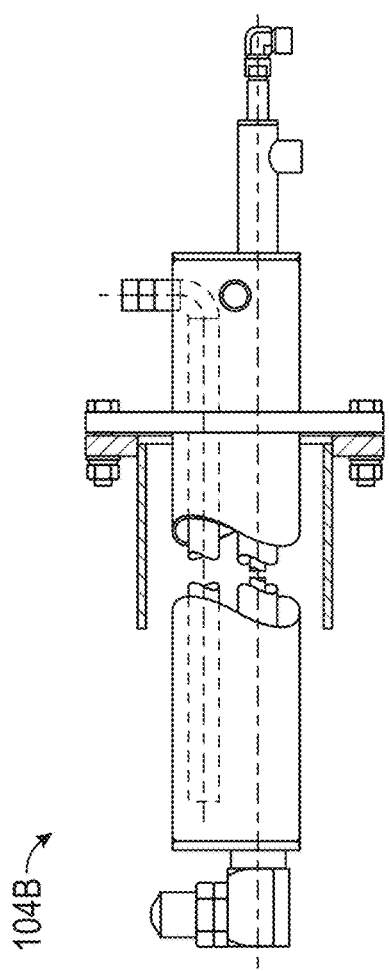
FIG. 20 is a side view of the sprayer of FIG. 19.
Figure 19:
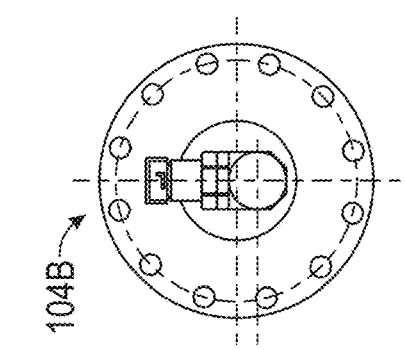
FIG. 19 is a front view of a sprayer of a cooling system according to aspects of the current disclosure.

FIGS. 19-21 illustrate an example of a sprayer for the cooling system 200, such as the sprayer 104B. In this example, a nozzle of the sprayer is configured to dispense the coolant along an axis that is substantially perpendicular to a central axis of the sprayer. In other examples, the nozzle of the sprayer may be oriented at various other angles relative to the central axis of the sprayer, and it need not be substantially perpendicular. It will be appreciated that in other examples, the sprayer 104A could have other configurations and/or other sprayers may have the configuration illustrated in FIGS. 19-21.

Figure 23:
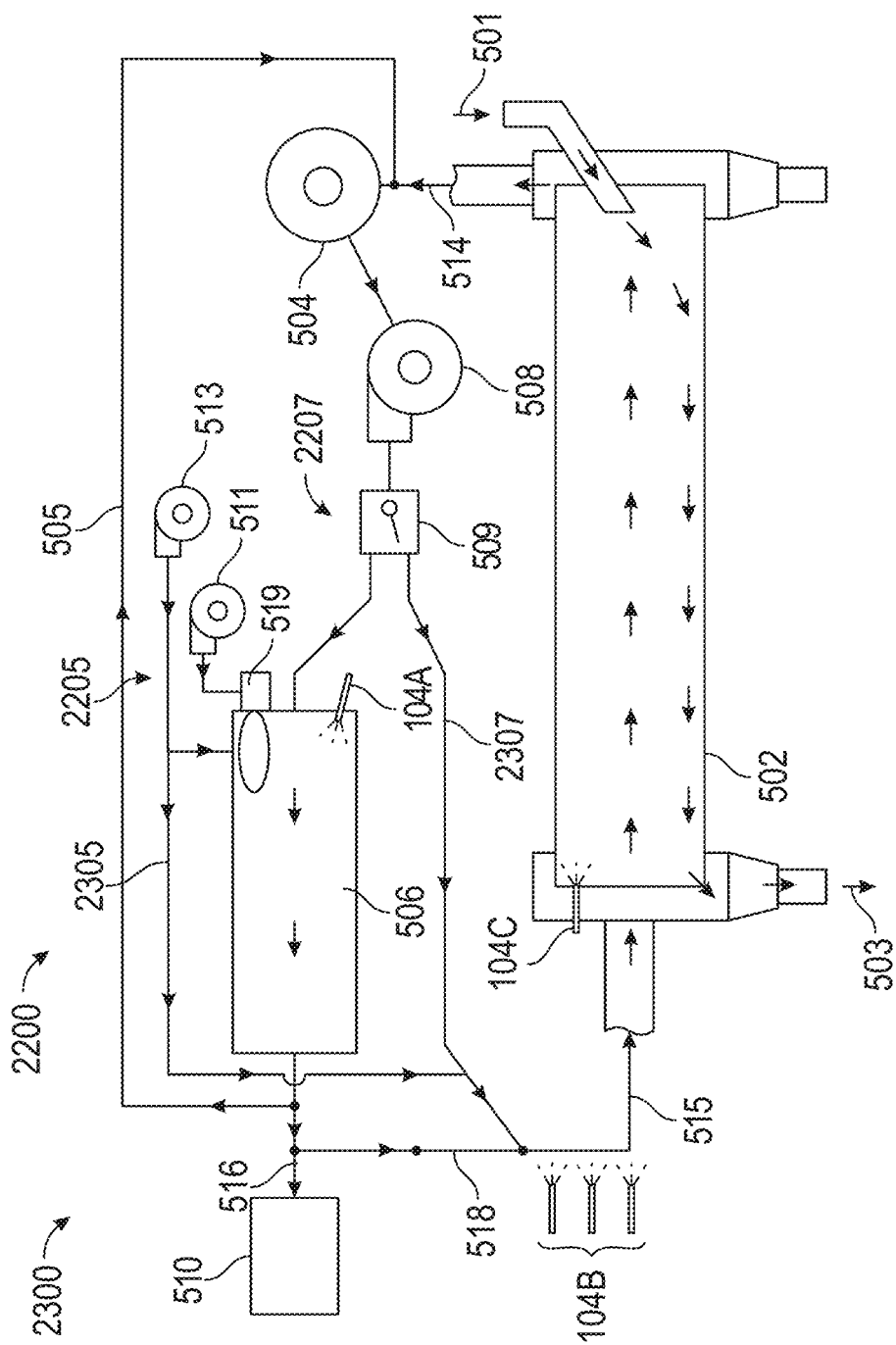
FIG. 23 is a schematic diagram of a decoating system including the cooling system of FIG. 22 according to aspects of the present disclosure.

FIG. 23 illustrates another example of a decoating system 2300 with the cooling system 2200. The decoating system 2300 is substantially similar to the decoating system 500 except that the cooling system 2200 additionally includes the oxygen control system 2205 and the organics control system 2207.

In this example, the oxygen control system 2205 includes the air mover 513 and a duct 2305. The oxygen control system 2205 is selectively controlled to control the amount of oxygen that is supplied to mix with the heated gas 515 that is injected into the kiln 102 to control the oxygen level within the kiln 102.

In this example, the organics control system 2207 includes the diverter 509 and a duct 2307. The organics control system 2207 may be controlled to control the amount of exhaust gas (which includes VOCs) that is diverted to mix with the heated gas 515 (rather than being fed into the afterburner 506). In some examples, the organics control system 2207 is controlled such that the diverter 509 diverts from about 50% to about 100% of the exhaust gas from the kiln to mix with the heated gas 515 and to control the accumulation of VOCs in the kiln 102.

Figure 24:
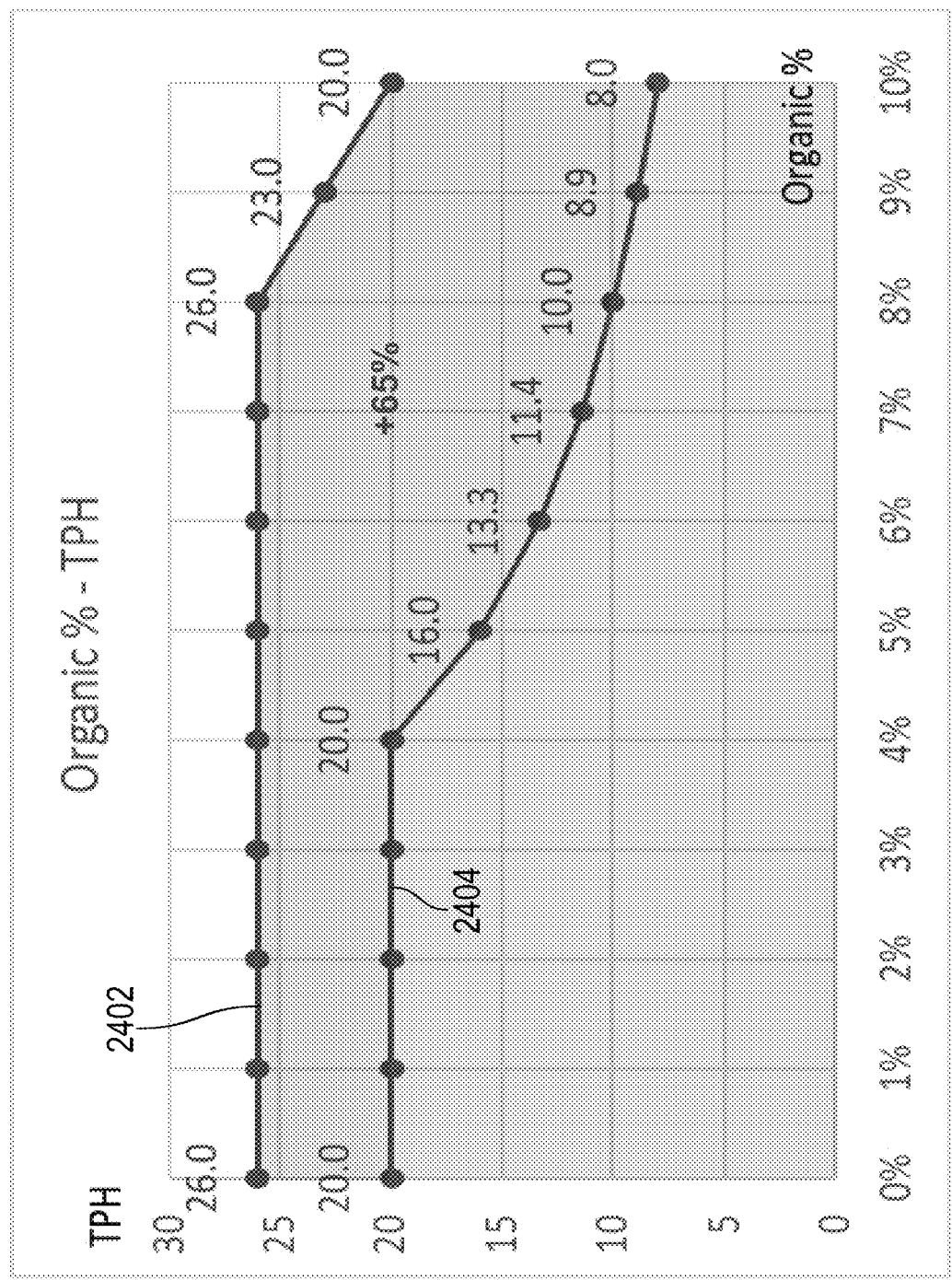
FIG. 24 is a graph illustrating the capacity of a kiln having a cooling system according to aspects of the current disclosure compared to the capacity of a kiln without a cooling system.

FIG. 24 is a graph illustrating an example of the capacity of a kiln having a cooling system according to aspects of the current disclosure (line 2402) compared to the capacity of a kiln without a cooling system (line 2404). The organic percentage of the scrap determines the capacity of the kiln. Referring to line 2404, a traditional decoating system without a cooling system may run at rater of about 20 tons per hour (TPH) at organic concentrations of about 0% to about 4%. However, above about 4% organic, the capacity must be decreased to minimize the risk of thermitting other serious damage to the equipment of the decoating system (due to the increased heat from the increased organic concentration). In contrast, and as represented by line 2402, a decoating system with the cooling system increased the capacity of the kiln by about 65% because the kiln was able to run at increased rates (e.g., about 26.0 TPH) for an increased range of organic concentration (e.g., about 0% to about 8% organic). In this example, the kiln represented by line 2402 was controlled by the cooling system such that the moisture percentage was a minimum of about 0.3%, a maximum of about 4.3%, and an average of about 1.4%. The kiln represented by line 2402 was controlled by the cooling system such that the organic percentage was a minimum of about 3.0%, a maximum of about 10.4%, and an average of about 5.2%. In this example, the density (g/cm$^3$) was further controlled to be a minimum of about 108 g/cm$^3$, a maximum of 173 g/cm$^3$, and an average of about 143 g/cm$^3$.

A collection of exemplary examples, including at least some explicitly enumerated as "Examples" providing additional description of a variety of example types in accordance with the concepts described herein are provided below. These examples are not meant to be mutually exclusive, exhaustive, or restrictive; and the invention is not limited to these example examples but rather encompasses all possible modifications and variations within the scope of the issued claims and their equivalents.

Example 1

A method of controlling a temperature of a decoating system with a cooling system, the method comprising: measuring a temperature within a piece of equipment of the decoating system; measuring a coolant characteristic of a coolant dispensed by a sprayer of the cooling system into the piece of equipment of the decoating system and receiving the measured coolant characteristic; and using a coolant control device to adjust the coolant characteristic based on at least one of the measured temperature or the measured coolant characteristic such that the cooling system provides at least one of a desired temperature or a desired coolant characteristic with the coolant.

Example 2

The method of any preceding or subsequent examples or combination of examples, wherein the coolant characteristic comprises at least one of a pressure of the coolant, a fluid flow rate of the coolant, and a spray angle of the coolant.

Example 3

The method of any preceding or subsequent examples or combination of examples, wherein the coolant characteristic is a fluid flow rate of the coolant, wherein the coolant control device is a control valve that selectively enables fluid flow of the coolant to the sprayer, and wherein adjusting the coolant control device comprises selectively positioning the control valve at a position from a fully closed position to a fully open position to control the fluid flow rate based on the measured temperature and the measured fluid flow rate.

Example 4

The method of any preceding or subsequent examples or combination of examples, wherein adjusting the coolant control device comprises positioning the control valve such that the fluid flow rate is from a minimum fluid flow rate to a maximum fluid flow rate based on the measured temperature and the measured fluid flow rate, and wherein the minimum fluid flow rate is greater than 0.0 L/min.

Example 5

The method of any preceding or subsequent examples or combination of examples, wherein the coolant characteristic is a fluid pressure of the coolant, wherein the coolant control device is a pressure control device, and wherein adjusting the coolant control device comprises selectively controlling the fluid pressure of the coolant with the pressure control device based on the measured temperature and the measured fluid pressure.

Example 6

The method of any preceding or subsequent examples or combination of examples, wherein the piece of equipment comprises at least one of a kiln, an afterburner, and a duct between the afterburner and kiln of the decoating system.

Example 7

The method of any preceding or subsequent examples or combination of examples, wherein the coolant characteristic is a spray angle of the coolant, wherein the coolant control device is a nozzle of the sprayer, and wherein adjusting the coolant control device comprises selectively positioning the nozzle to adjust the spray angle based on the measured temperature and the measured spray angle.

Example 8

A cooling system for a decoating system, the cooling system comprising: a sensor configured to measure a coolant characteristic of a coolant dispensed by a sprayer into the decoating system; a coolant control device controlling the coolant characteristic of the coolant; and a controller communicatively coupled with the sensor and the coolant control device, wherein the controller is configured to adjust the coolant control device to adjust the coolant characteristic of the coolant based on at least one of a measured temperature within the decoating system or the measured coolant characteristic such that the cooling system provides at least one of a desired temperature or the coolant with a desired coolant characteristic.

Example 9

The cooling system of any preceding or subsequent examples or combination of examples, further comprising the sprayer, and wherein the sprayer is configured to dispense the coolant in at least one of a kiln, an afterburner, and a duct between the afterburner and the kiln of the decoating system.

Example 10

The cooling system of any preceding or subsequent examples or combination of examples, wherein the sprayer is a first sprayer, and wherein the cooling system further comprises a second sprayer that is configured to dispense the coolant in at least one of the kiln, the afterburner, or the duct different from the first sprayer.

Example 11

The cooling system of any preceding or subsequent examples or combination of examples, wherein the controller is configured to adjust the coolant control device such that the coolant characteristic of the coolant dispensed from the first sprayer is different from the coolant characteristic of the coolant dispensed from the second sprayer.

Example 12

The cooling system of any preceding or subsequent examples or combination of examples, wherein the sprayer is oriented relative to a flow path of a gas through the decoating system such that the sprayer dispenses the coolant at a non-zero angle relative to the flow path.

Example 13

The cooling system of any preceding or subsequent examples or combination of examples, wherein an operating temperature of the sprayer is from about 550° C. to about 1000° C.

Example 14

The cooling system of any preceding or subsequent examples or combination of examples, wherein an operating temperature of the sprayer is from about 800° C. to about 1000° C.

Example 15

The cooling system of any preceding or subsequent examples or combination of examples, further comprising a temperature sensor configured to measure the measured temperature within the decoating system.

Example 16

The cooling system of any preceding or subsequent examples or combination of examples, wherein the temperature sensor is configured to measure the measured temperature in at least one of a kiln, an afterburner, and a duct between the afterburner and the kiln of the decoating system.

Example 17

The cooling system of any preceding or subsequent examples or combination of examples, wherein the temperature sensor is a first temperature sensor, wherein the cooling system further comprises a second temperature sensor that is configured to measure a second temperature in at least one of the kiln, the afterburner, or the duct different from the first temperature sensor, and wherein the controller is configured to control the coolant control device based on the second temperature.

Example 18

The cooling system of any preceding or subsequent examples or combination of examples, wherein the coolant characteristic comprises at least one of a pressure of the coolant, a fluid flow rate of the coolant, an air flow rate, and a spray angle of the coolant.

Example 19

The cooling system of any preceding or subsequent examples or combination of examples, wherein the coolant characteristic is a fluid flow rate of the coolant, wherein the coolant control device is a control valve that selectively enables fluid flow of the coolant to the sprayer, and wherein the controller is configured to adjust the coolant control device by selectively positioning the control valve at a position from a fully closed position to a fully open position to control the fluid flow rate based on the measured temperature and the measured fluid flow rate.

Example 20

The cooling system of any preceding or subsequent examples or combination of examples, wherein the controller is configured to position the control valve such that the fluid flow rate is from a minimum fluid flow rate to a maximum fluid flow rate based on the measured temperature and the measured fluid flow rate.

Example 21

The cooling system of any preceding or subsequent examples or combination of examples, wherein the minimum fluid flow rate is greater than about 0.0 L/min.

Example 22

The cooling system of any preceding or subsequent examples or combination of examples, wherein the minimum fluid flow rate about 2.6 L/min.

Example 23

The cooling system of any preceding or subsequent examples or combination of examples, wherein the minimum fluid flow rate is about 4.9 L/min.

Example 24

The cooling system of any preceding or subsequent examples or combination of examples, wherein the minimum fluid flow rate is from about 0.0 L/min and wherein the maximum fluid flow rate is about 65 L/min.

Example 25

The cooling system of any preceding or subsequent examples or combination of examples, wherein the minimum fluid flow rate is from about 0.0 L/min and wherein the maximum fluid flow rate is about 40 L/min.

Example 26

The cooling system of any preceding or subsequent examples or combination of examples, wherein the coolant characteristic is a fluid pressure of the coolant, wherein the coolant control device is a pressure control device, and wherein the controller is configured to adjust the coolant control device by selectively controlling the fluid pressure of the coolant with the pressure control device based on the measured temperature and the measured fluid pressure.

Example 27

The cooling system of any preceding or subsequent examples or combination of examples, wherein the coolant characteristic is a spray angle of the coolant, wherein the coolant control device is a nozzle of the sprayer, and wherein the controller is configured to adjust the coolant control device by selectively positioning the nozzle to adjust the spray angle based on the measured temperature and the measured spray angle.

Example 28

The cooling system of any preceding or subsequent examples or combination of examples, wherein the nozzle is adjusted such that the spray angle is about 55 degrees.

Example 29

A decoating system comprising the cooling system of any preceding or subsequent examples or combination of examples.

Example 30

A method of controlling a temperature of a decoating system with a cooling system, the method comprising: measuring a temperature within a piece of equipment of the decoating system; measuring a characteristic the cooling system in the piece of equipment of the decoating system and receiving the measured characteristic; and controlling the cooling system to adjust the characteristic based on at least one of the measured temperature or the measured characteristic such that the cooling system provides at least one of a desired temperature or a desired characteristic.

Example 31

The method of any preceding or subsequent examples or combination of examples, wherein the characteristic is a coolant characteristic, and wherein controlling the cooling system comprises using a coolant control device to adjust the coolant characteristic based on at least one of the measured temperature and the measured coolant characteristic such that the cooling system provides at least one of the desired temperature or a coolant with a desired coolant characteristic.

Example 32

The method of any preceding or subsequent examples or combination of examples, wherein the characteristic is a gas characteristic in the piece of equipment, and wherein the piece of equipment comprises a kiln of the decoating system.

Example 33

The method of any preceding or subsequent examples or combination of examples, wherein the gas characteristic is an oxygen level within the kiln, and wherein controlling the cooling system comprises controlling an oxygen control system of the cooling system based on at least one of the measured temperature or the measured oxygen level such that the cooling system provides at least one of the desired temperature or a desired oxygen level.

Example 34

The method of any preceding or subsequent examples or combination of examples, wherein the gas characteristic is an organic concentration within the kiln, and wherein controlling the cooling system comprises controlling an organics control system of the cooling system based on at least one of the measured temperature of the measured organic concentration such that the cooling system provides at least one of the desired temperature or a desired organic concentration.

Example 35

A cooling system for a decoating system, the cooling system comprising: a sensor configured to measure a characteristic the cooling system in the decoating system; a control device controlling the characteristic of the cooling system; and a controller communicatively coupled with the sensor and the control device, wherein the controller is configured to adjust the control device to adjust the characteristic of the cooling system based on at least one of a measured temperature within the decoating system or the measured characteristic such that the cooling system provides at least one of a desired temperature or a desired characteristic.

Example 36

The cooling system of any preceding or subsequent examples or combination of examples, wherein the characteristic of the cooling system is a coolant characteristic of a coolant and wherein the control device is a coolant control device.

Example 37

The cooling system of any preceding or subsequent examples or combination of examples, wherein the characteristic of the cooling system is a gas characteristic of gas in a kiln of the decoating system.

Example 38

The cooling system of any preceding or subsequent examples or combination of examples, wherein the gas characteristic is an oxygen level, and wherein the control device is an oxygen control system.

Example 39

The cooling system of any preceding or subsequent examples or combination of examples, wherein the gas characteristic is an organic concentration, and wherein the control device is an organics control system.

The above-described aspects are merely possible examples of implementations, merely set forth for a clear understanding of the principles of the present disclosure. Many variations and modifications can be made to the above-described example(s) without departing substantially from the spirit and principles of the present disclosure. All such modifications and variations are included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed is:

1. A method of controlling a temperature of a decoating system with a cooling system, the method comprising:
    measuring a temperature within a piece of equipment of the decoating system;
    measuring a coolant characteristic of a coolant dispensed by a sprayer of the cooling system into the piece of equipment of the decoating system and receiving the measured coolant characteristic, wherein the coolant characteristic is a fluid pressure of the coolant; and using a coolant control device to adjust the coolant characteristic such that the cooling system provides at least one of a desired temperature or a desired coolant characteristic with the coolant, wherein the coolant control device is a pressure control device, and wherein adjusting the coolant control device comprises selectively controlling the fluid pressure of the coolant with the pressure control device based on the measured temperature and the measured fluid pressure.

2. The method of claim 1, wherein the coolant characteristic is a first coolant characteristic, wherein the method further comprises measuring a second coolant characteristic comprising at least one of a a fluid flow rate of the coolant, or a spray angle of the coolant.

3. The method of claim 1, wherein the piece of equipment comprises at least one of a kiln, an afterburner, and a duct between the afterburner and kiln of the decoating system.

4. The method of claim 1, wherein the coolant characteristic is a first coolant characteristic and the coolant control device is a first coolant control device, wherein the method further comprises measuring a second coolant characteristic comprising a spray angle of the coolant and adjusting the second coolant characteristic with a second coolant control device, wherein the second coolant control device is a nozzle of the sprayer, and wherein adjusting the second coolant control device comprises selectively positioning the nozzle to adjust the spray angle based on the measured temperature and the measured spray angle.

5. The method of claim 1, wherein the coolant characteristic is a first coolant characteristic and the coolant control device is a first coolant control device, wherein the method further comprises measuring a second coolant characteristic comprising a fluid flow rate of the coolant and adjusting the second coolant characteristic with a second coolant control device, wherein the second coolant control device is a control valve that selectively enables fluid flow of the coolant to the sprayer, and wherein adjusting the second coolant control device comprises selectively positioning the control valve at a position from a fully closed position to a fully open position to control the fluid flow rate based on the measured temperature and the measured fluid flow rate.

6. The method of claim 5, wherein adjusting the second coolant control device comprises positioning the control valve such that the fluid flow rate is from a minimum fluid flow rate to a maximum fluid flow rate based on the measured temperature and the measured fluid flow rate, and wherein the minimum fluid flow rate is greater than 0.0 L/min.

7. A method of controlling a temperature of a decoating system with a cooling system, the method comprising:

measuring a temperature within a piece of equipment of the decoating system;

measuring a characteristic the cooling system in the piece of equipment of the decoating system and receiving the measured characteristic, wherein the characteristic is a fluid pressure of a coolant; and controlling the cooling system to adjust the characteristic such that the cooling system provides at least one of a desired temperature or a desired characteristic, wherein the cooling system comprises a pressure control device, and wherein controlling the cooling system comprises selectively controlling the fluid pressure of the coolant with the pressure control device based on the measured temperature and the measured fluid pressure.

8. The method of claim 7, wherein the characteristic is a first characteristic, and wherein the method further comprises controlling the cooling system to control a gas characteristic in the piece of equipment, and wherein the piece of equipment comprises a kiln of the decoating system.

9. The method of claim 8, wherein the gas characteristic is an oxygen level within the kiln, and wherein controlling the cooling system comprises controlling an oxygen control system of the cooling system based on at least one of the measured temperature or the measured oxygen level such that the cooling system provides at least one of the desired temperature or a desired oxygen level.

10. The method of claim 8, wherein the gas characteristic is an organic concentration within the kiln, and wherein controlling the cooling system comprises controlling an organics control system of the cooling system based on at least one of the measured temperature of the measured organic concentration such that the cooling system provides at least one of the desired temperature or a desired organic concentration.

* * * * *